Feb. 28, 1956   J. B. ARMITAGE ET AL   2,736,243
MACHINE TOOL ELEVATING MECHANISM
Filed Jan. 19, 1950   10 Sheets-Sheet 6
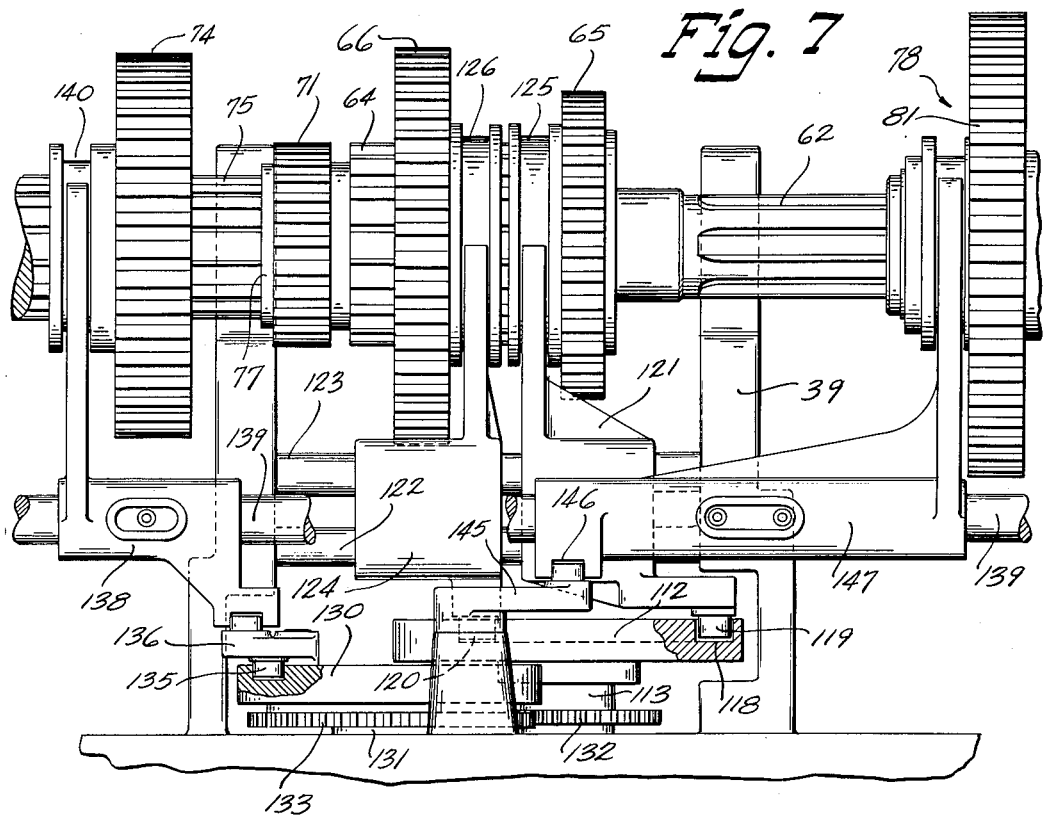
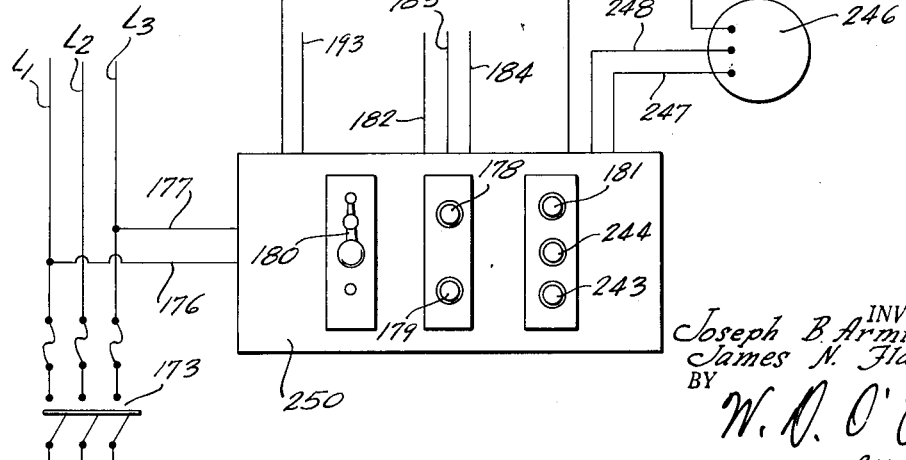
INVENTORS
Joseph B. Armitage &
James N. Flannery
BY
W. D. O'Connor
Attorney

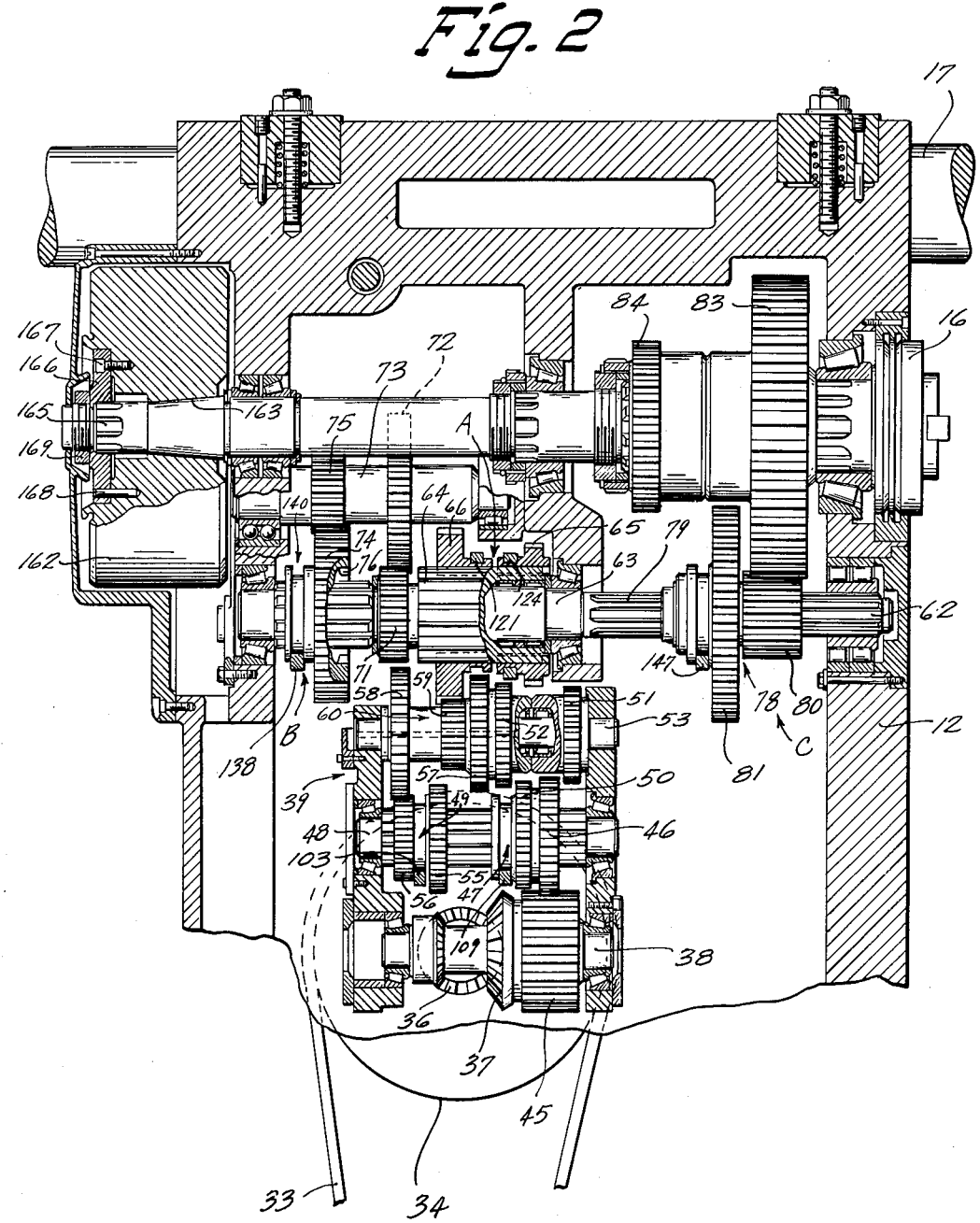

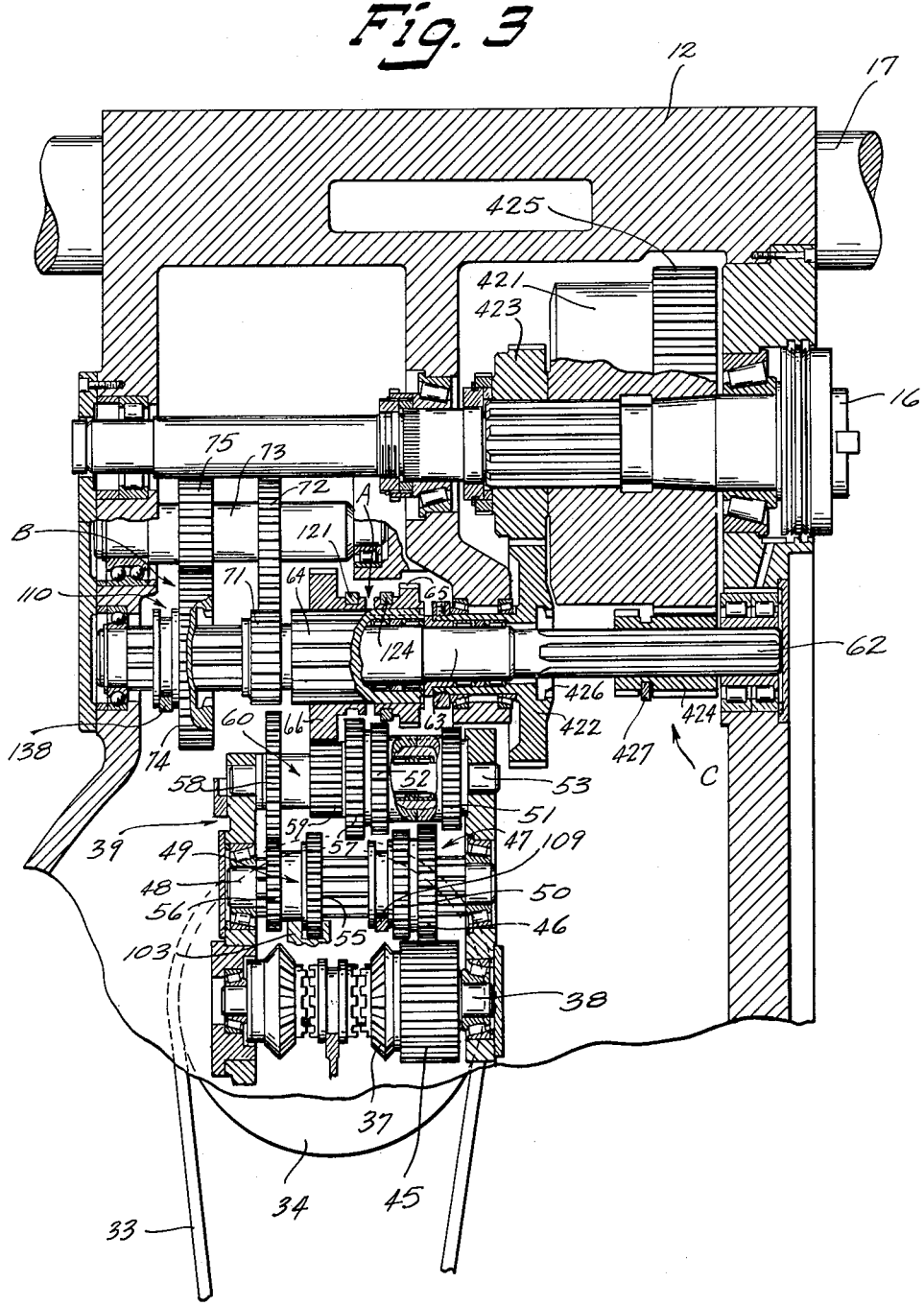

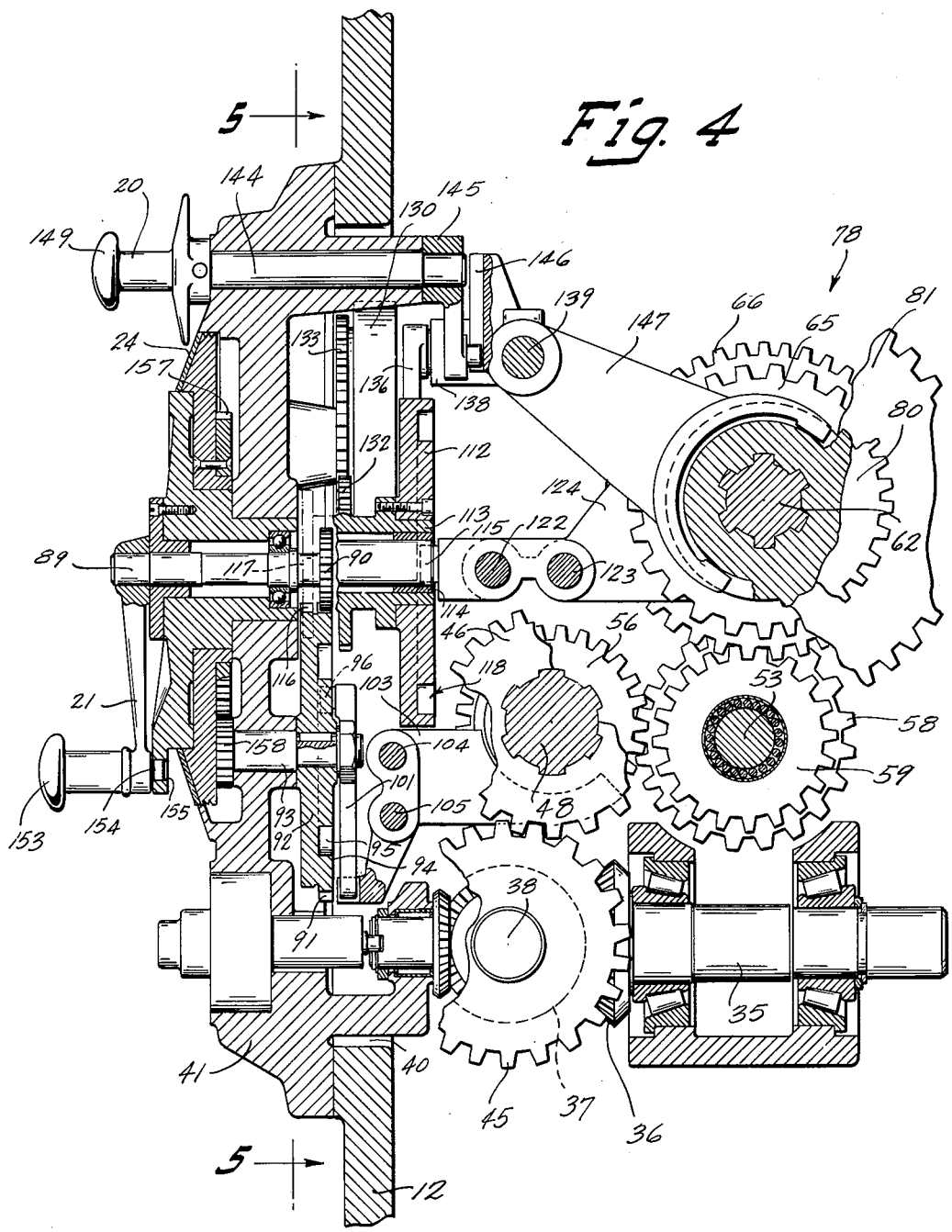

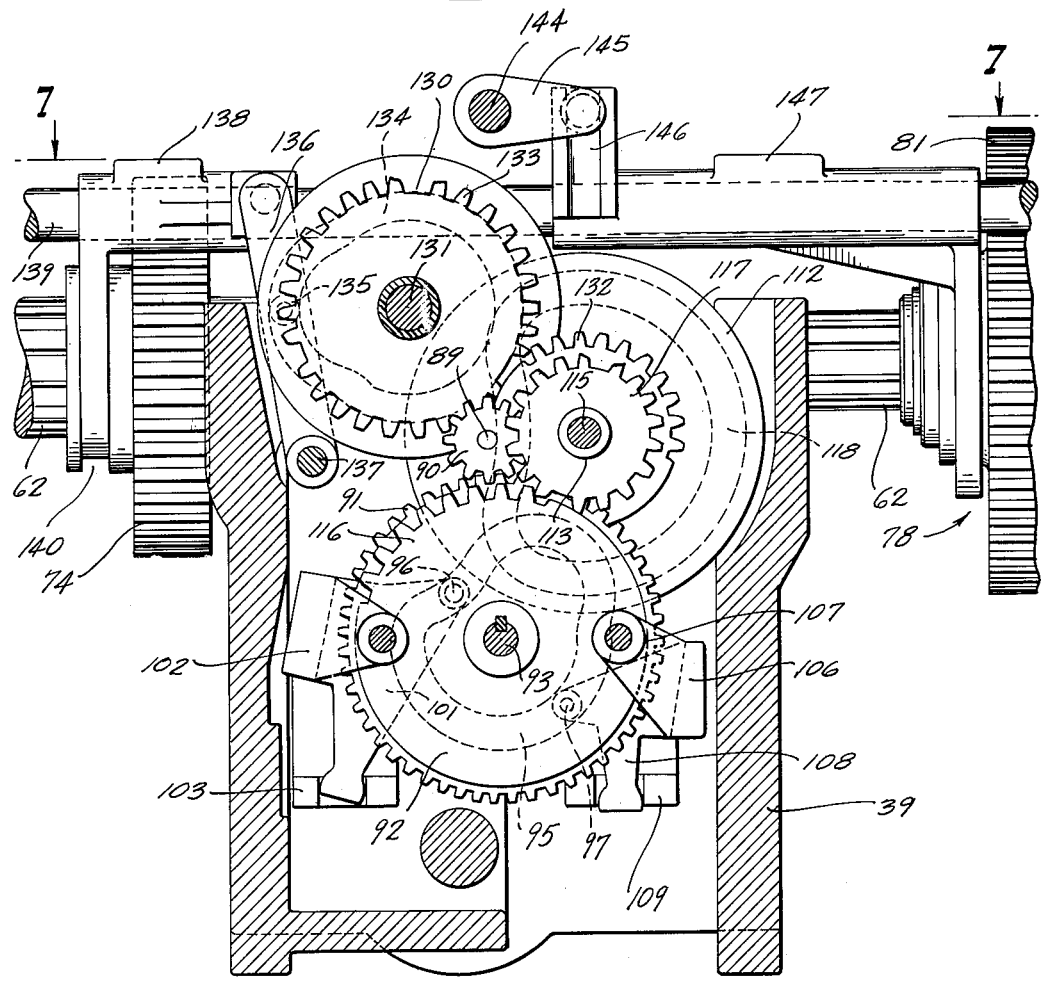
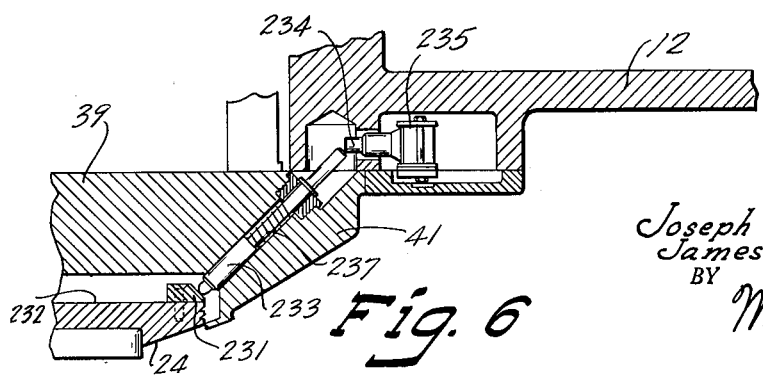

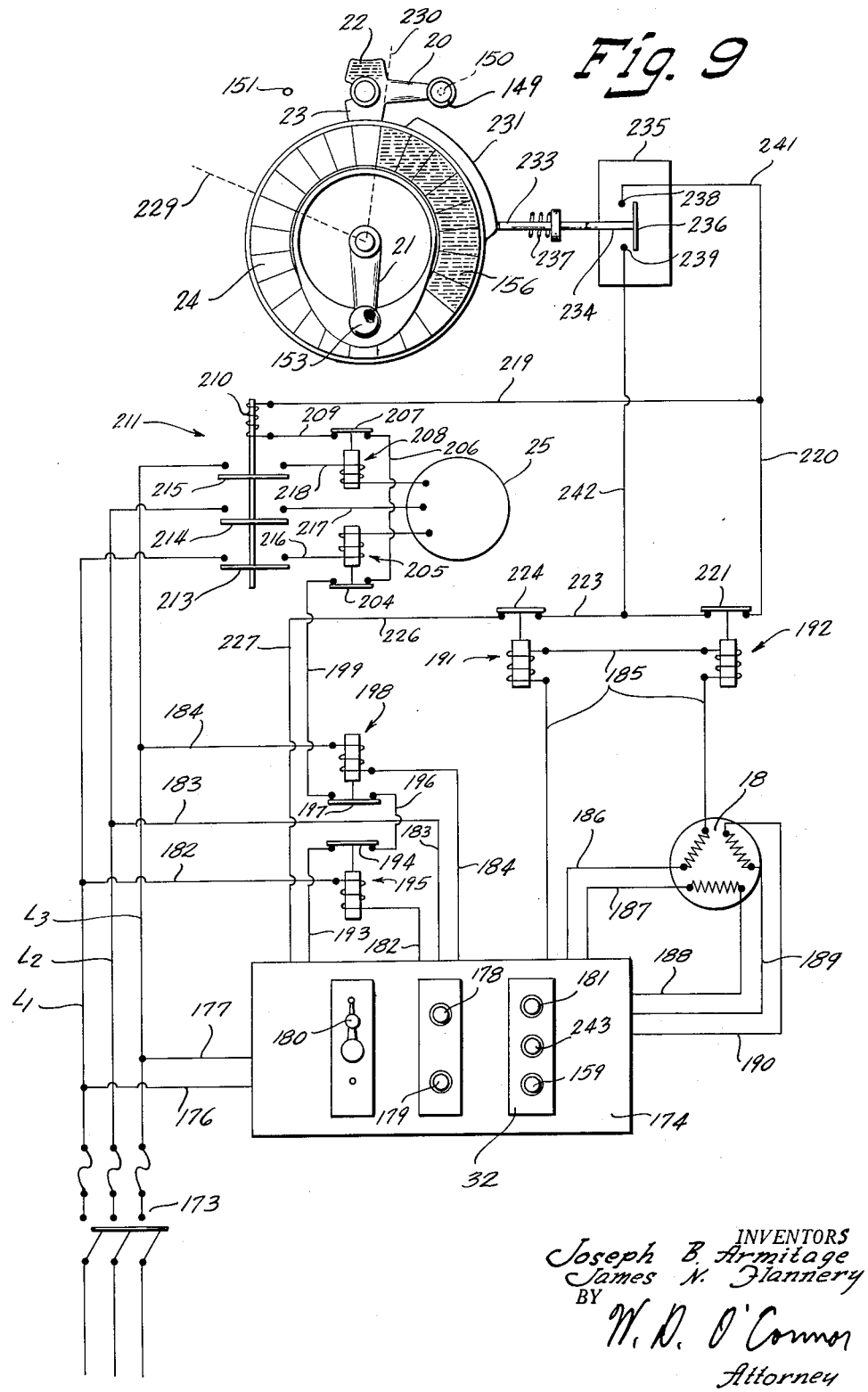

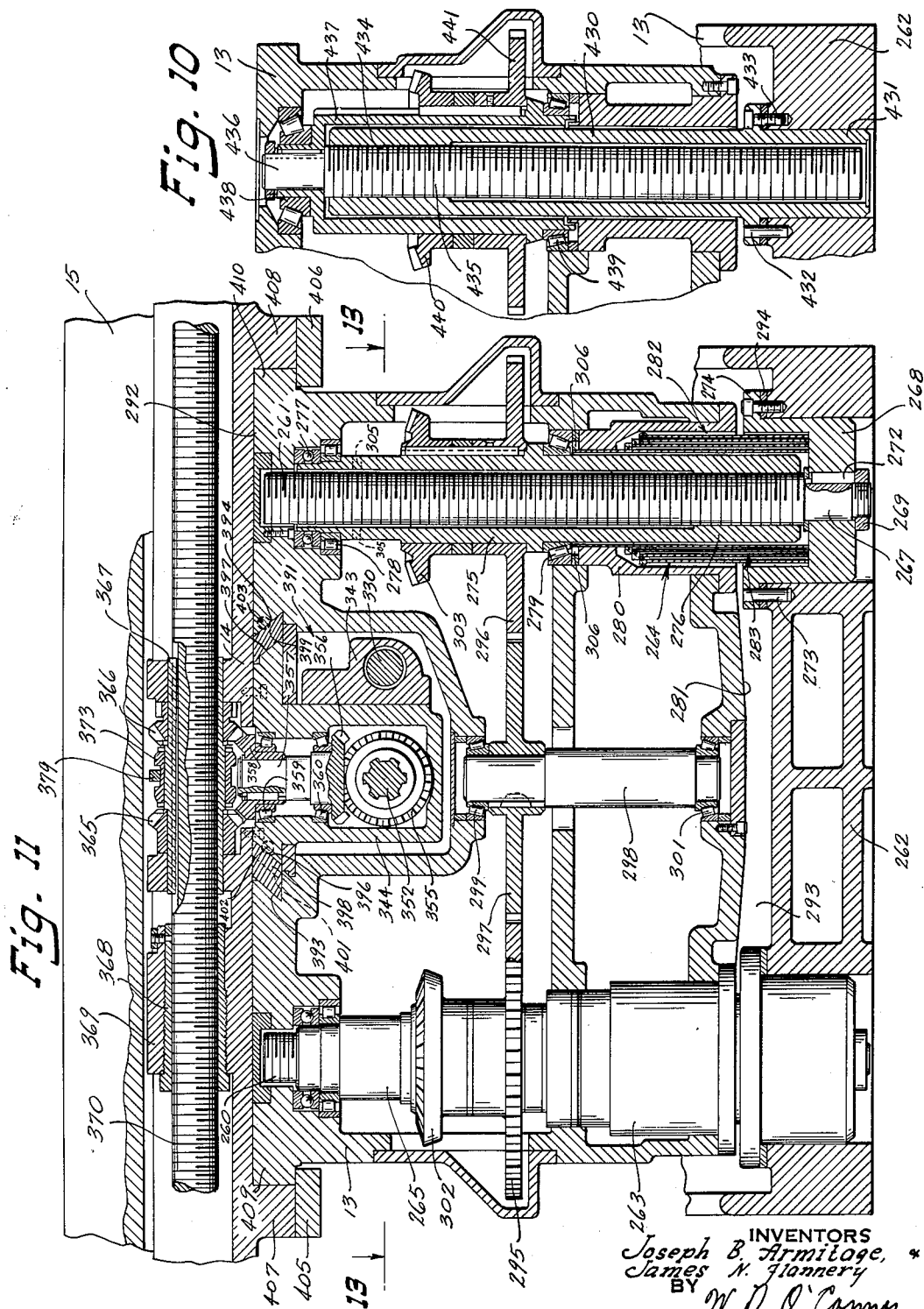

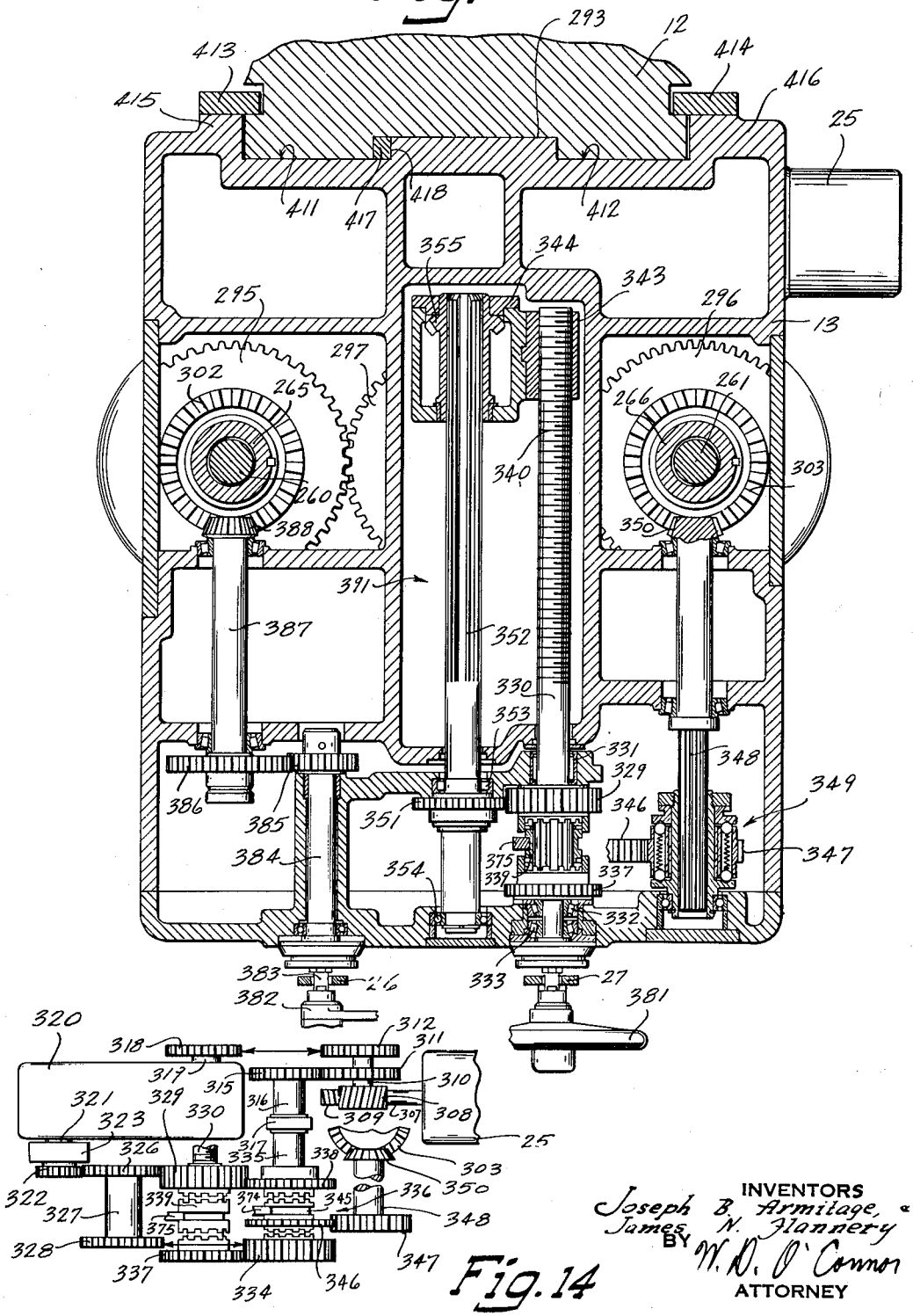

United States Patent Office 2,736,243
Patented Feb. 28, 1956

2,736,243

MACHINE TOOL ELEVATING MECHANISM

Joseph B. Armitage, Wauwatosa, and James N. Flannery, West Milwaukee, Wis., assignors to Kearney & Trecker Corporation, West Allis, Wis., a corporation of Wisconsin Application January 19, 1950, Serial No. 139,342

18 Claims. (Cl. 90—21)

This invention relates generally to improvements in machine tools and more particularly to an improved work supporting structure and an improved elevating mechanism for effecting selective vertical movement of the movable work supporting members of a milling machine.

A general object of the invention is to provide improvements in the construction of work supporting structure for a milling machine.

Another object is to provide an improved elevating mechanism for the vertically movable work support of a milling machine.

Another object is to provide for the vertically adjustable work support of a machine tool an improved elevating mechanism arranged to minimize deflection of the work support caused by cutting pressures developed during a machining operation.

Another object is to provide an improved elevating mechanism for a machine tool comprising a plurality of coordinately operable telescoping members arranged in parallelism and being operatively connected to effect an equalized vertical adjustment of a machine tool element.

A further object is an improved mechanism for obtaining synchronism between a pair of spaced apart screw and nut elevating mechanisms for a machine tool.

A further object is to provide an improved lubricating system for an improved screw and nut type elevating mechanism for a machine tool.

A still further object is to provide an improved elevating mechanism for a machine tool that comprises a pair of spaced apart, synchronously operable screw and nut devices that are operatively connected to effect an equalized vertical adjustment of a work supporting member.

According to this invention, a machine tool such as a milling machine, is provided with a high powered motor operatively connected to drive a tool spindle with relatively high torque at high rates of speeds for faster removal of metal from a workpiece, and a cooperating work supporting member disposed to be selectively driven along three mutually transverse lines of movement. To minimize deflection of the work supporting members normally resulting from cutting pressures developed as a workpiece carried thereby is fed to a cutter mounted on the spindle, there is provided an improved elevating mechanism comprising a plurality of synchronously operable telescoping screw and nut members arranged to effect an equalized vertical adjustment of the work supporting member relative to the tool supporting spindle. The improved elevating mechanism is especially adapted to reduce to a minimum any deflection of the work supporting members. To maintain synchronism between the spaced apart telescoping members, a pair of large diameter gears respectively connected to actuate each of said telescoping members are operatively interconnected by a large diameter idler journalled in one of the telescoping members. For effecting a selective vertical adjustment of the work supporting members, a power driven variable feed transmission mechanism is operatively connected to drive the interconnected gearing that is in turn operatively connected to drive the telescoping members.

The foregoing and other objects of the invention which will become more fully apparent from the following detailed description of apparatus exemplifying the invention, may be achieved by the milling machine described herein as a preferred embodiment thereof in connection with the accompanying drawings, in which:

Fig. 2 is a vertical longitudinal sectional view through the upper part of the machine, showing the spindle driving transmission mechanism;

Fig. 3 is a vertical longitudinal sectional view through the upper part of the machine, showing a modified form of spindle driving transmission mechanism;

Fig. 4 is an enlarged fragmentary vertical transverse sectional view through the upper part of the machine, showing the speed controlling apparatus for the spindle driving transmission mechanism;

Fig. 5 is a vertical longitudinal sectional view taken on the line 5—5 of Fig. 4 and showing a portion of the speed controlling apparatus;

Fig. 6 is an enlarged fragmentary detail view in horizontal section taken on the line 6—6 of Fig. 1 and showing the cam actuated switching mechanism for the variable torque limiting control device;

Fig. 7 is a horizontal sectional view taken on the line 7—7 of Fig. 5 and showing a portion of the speed controlling and power transmitting mechanisms;

Fig. 8 is a fragmentary schematic circuit diagram illustrating a modification of the circuit diagram shown in Fig. 9;

Fig. 9 is a schematic electrical circuit diagram incorporating a variable torque limiting control device embodying the features of this invention;

Fig. 10 is a fragmentary view in vertical section through the rightward side of the work supporting knee and showing a part of an elevating mechanism illustrating a modification of the elevating mechanism shown in Fig. 11;

Fig. 11 is a vertical sectional view through the forward portion of the machine including the knee, saddle and table illustrating an improved elevating mechanism embodying the features of this invention;

Fig. 13 is an enlarged view in horizontal section taken on the line 13—13 of Fig. 11 and showing the power transmitting mechanisms and a part of the control mechanism for effecting operation of the knee elevating mechanism and for moving the table along its several lines of movement; and Fig. 14 is a schematic view of the power transmitting and distributing mechanism for effecting selective movement of the table along its several lines of movement.

Figure 1:
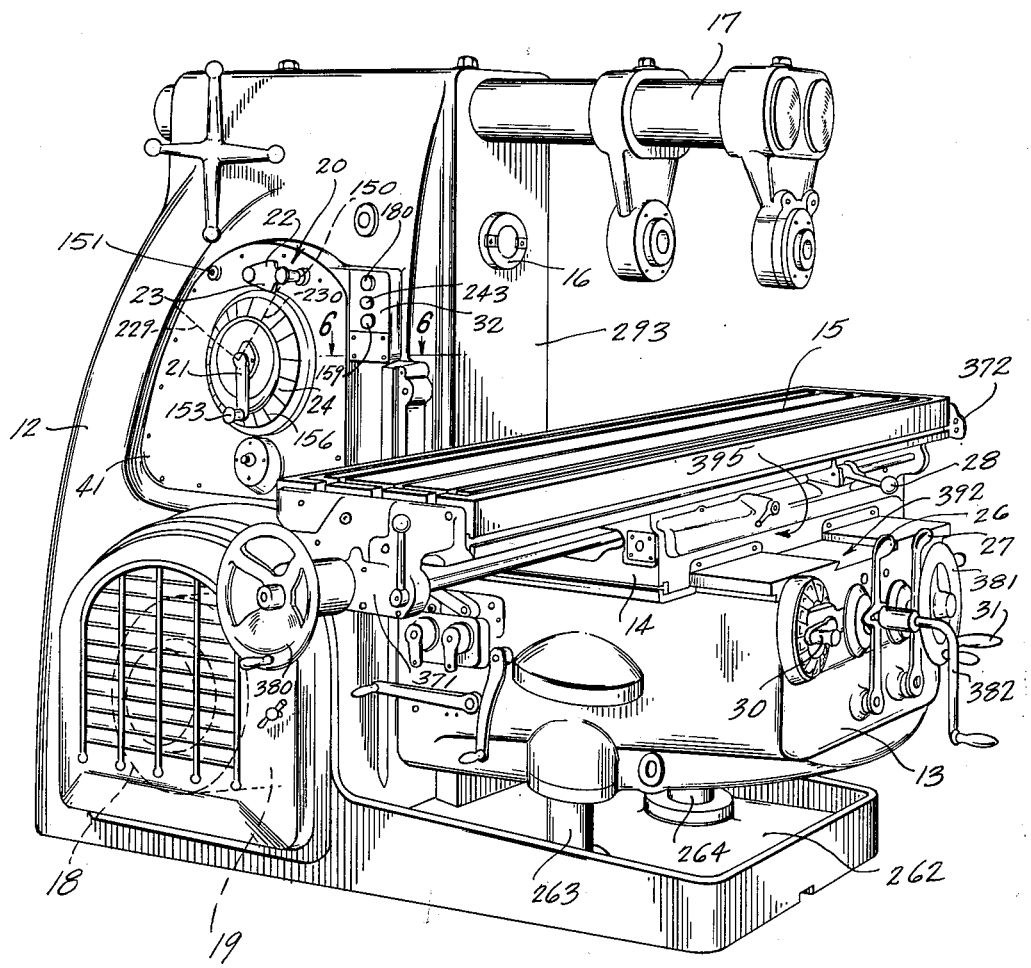
Figure 1 is a view in perspective depicting the left side of a milling machine of the knee and column type incorporating a preferred form of the invention.

Referring more particularly to the drawings and especially to Fig. 1 thereof, the machine tool there shown as an example of apparatus constituting a preferred embodiment of the invention, is a milling machine of the well known horizontal spindle type generally similar in overall structure to the machine more fully shown and described in United States Patent No. 2,497,842 which issued on February 14, 1950. As shown in Fig. 1 of the drawings, the milling machine structure comprises essentially an upstanding column 12 which serves to carry on its face a knee 13, saddle 14, and work supporting table 15 superimposed for selectively slidable movement in a plurality of mutually transverse planes. Near the top of the column 12 there is journalled the usual horizontally disposed tool supporting spindle 16 and above it are slidably mounted overarms 17 for supporting a cutter arbor (not shown) that may be mounted in the spindle 16 in well known manner to carry a cutter in cooperating relationship with a workpiece on the work supporting table 15.

Power for rotating the tool spindle 16 is derived from a relatively high powered motor 18 that is mounted in a motor compartment 19 formed within and extending transversely of the lower part of the column 12. The speed at which the spindle 16 is operated may be adjusted by means of a range change lever 20 and a speed selecting lever or crank 21 mounted on the left side of the column 12, the levers functioning cooperatively to shift speed changing gearing mounted within the column 12, directly above but separated from the motor compartment 19. The spindle speed is indicated by the coordinated positioning of a pair of range change indicating plates 22 and 23 associated with the range change lever 20, in cooperation with a speed indicating dial 24 that is connected to be turned by the crank 21.

As illustrated in Fig. 13, power for effecting movement of the vertically slidable knee 13, the transversely slidable saddle 14 and the longitudinally slidable table 15 is derived from a separate feed motor 25 mounted on the rightward side of the knee 13 and ararnged to be operated coordinately with the relatively high powered spindle driving motor 18. In order to effect selective directional movement of the knee 13, saddle 14, and table 15, there are provided at the front of the machine, as shown in Fig. 1, directional shifting levers 26, 27 and 28 operatively connected to actuate reversing clutch mechanisms for transmitting power to drive the respectively movable members. To minimize lateral deflection of the knee 13 and provide maximum rigidity for the work supporting table 15 during a cutting operation, there is provided an improved elevating mechanism for the knee, as will hereinafter be more fully explained, and which is arranged to be actuated under control of the directional shifter lever 26. For effecting selective feeding movement of the work supporting table 15 relative to the cutter spindle 16, there is provided on the front of the knee a feed rate selecting lever 30 connected to shiftably adjust a variable speed, feed transmission contained in a gear compartment formed within the knee 13. In order to effect movement of the knee 13, saddle 14 or table 15 at a fast or rapid traverse rate of speed, a rapid traverse lever 31 is connected to effect energization of the feed motor 25 and simultaneously therewith to actuate clutching mechanism to effect transmission of power to drive each of the reversing mechanisms respectively engageable on movement of the feed directional levers 26, 27 and 28.

For effecting coordinated energization of the spindle driving motor 18 and the feed motor 25, a control station 32 mounted on the left side of the column is provided with controlling means for coordinately starting or stopping the spindle motor 18 and the feed motor 25, as well as inching control means arranged to effect a momentary energization of the spindle driving motor, as will hereinafter be more fully explained.

Referring now to Figs. 2 and 4 of the drawings, power for rotating the spindle 16 is transmitted from the main drive motor 18 in the motor compartment 19 by means of multiple belts 33 that pass over a pulley 34. The pulley 34, in turn, is journalled to rotate on the side of the machine column and is connected to transmit power to a shaft 35 which extends into the column and has integrally formed with it a driving bevel gear 36. The driving bevel gear 36 transmits driving power to a meshing driven bevel gear 37 which is secured to one end of a shaft 38.

The shaft 38 is rotatably journalled in a speed box 39 which extends within a gear compartment 40 above the motor compartment in the column through an opening in the left side thereof. As shown in Fig. 1, a cover plate or control panel 41 supports the speed box 39 within the column opening and carries the range change lever 20 and the speed selecting crank 21, as well as the range change indicating plates 22 and 23 and the speed indicating dial 24 respectively associated therewith for indicating the selected driving speed of the spindle 16.

Referring again to Fig. 2, the driven bevel gear 37 is integrally formed with an elongated spur pinion 45 which meshes with one gear 46 of a couplet 47 that is slidably mounted for selective longitudinal movement on a short splined shaft 48 parallelly journalled in the speed box 39. The splined shaft 48, together with the gear couplet 47 and a second gear couplet 49 slidably carried by the shaft for longitudinal shifting movement, constitute elements of a speed changing device A forming one part of the speed changing transmission mechanism. The couplet 47 comprises the gear 46 and a gear 50 joined together and disposed to be selectively meshed alternatively with cooperating idler gears 51 and 52, respectively, rotatably journalled on an idler shaft 53 that is fixedly mounted within the speed box 39 above and parallel to the rotatably journalled splined shaft 48. The second couplet 49 slidably mounted on the splined shaft 48, comprises a gear 55 and a gear 56 joined together and disposed to be selectively meshed alternatively with a gear 57 and a gear 58, respectively, also journalled on the shaft 53. The four idler gears 51, 52, 57, and 58 together with a gear 59 journalled on the stationary shaft 53, are secured together in manner to rotate as one unitary intermediate idler cluster 60 of the speed changing device A. The two couplets on the shaft 48 constituting the primary element of the speed changing device A may be shifted to engage each of the four gears in turn with its complementary idler gear on the shaft 53 to drive all of the idler gears constituting the idler cluster 60 at any one of four different rates of speed.

Above the stationary shaft 53 and disposed parallel to it is a longer shaft 62 that is journalled directly in the column 12 and that, in turn, has rotatably journalled on its central portion, adjacent a shoulder 63, an externally splined sleeve 64. Slidably mounted on the splined sleeve 64 are shiftable gears 65 and 66 which are selectively slidable to mesh with the idler gears 52 and 59, respectively, which form parts of the intermediate idler cluster 60. The sliding gears 65 and 66 constitute a secondary element of the speed changing mechanism A and may be selectively positioned to transmit driving power from the intermediate idler cluster 60 to the splined sleeve 64 at either of two speed ratios.

Since the primary element of the variable speed device A constituted by the couplets 47 and 49 is capable of four different speed rates and the secondary element constituted by the gears 65 and 66 is capable of two speed rates, it is evident that the splined sleeve 64 may be driven at any one of eight speeds. This is accomplished by suitably engaging different ones of the sliding gears in the primary and secondary elements with their cooperating idler gears constituting the intermediate speed transmitting idler cluster 60. As indicated in Fig. 2, the gears are shown in position to drive the splined sleeve 64 at the lowest speed rate of the eight speeds available through the speed changing device A with the large gear 66 of the secondary element engaging the small idler gear 59 and the small gear 56 of the primary element engaging the large idler gear 58. As will hereinafter be more fully explained, the speed selecting crank 21 and the indicating dial 24 are movable to a plurality of positions providing for an operating condition within the speed changing transmission device A in which a selected one of the gears of the primary element and a selected gear of the secondary element are in mesh with cooperating gears of the intermediate idler cluster 60 rotatably journalled on the shaft 53.

From the externally splined sleeve 64 rotatably journalled on the shaft 62, power is transmitted through an intermediate range changing mechanism B to drive the rotatably journalled shaft 62 in a selected one of two speed rate series. Power is then transmitted from the shaft 62 through a final range changing mechanism C which functions to deliver power to the tool spindle 16 in a high or a low operating range alternatively. The intermediate range changer B and the range changer C are positionable in a plurality of shiftably adjusted positions and are so proportioned as to provide three distinct operating ranges including a low, intermediate and high range in such a manner that the full compass of the speed changing device A may be utilized in each of the three ranges without overlapping or discontinuity between the ranges.

A gear 71 rotatably journalled toward the rearward central portion of the shaft 62 is secured to the splined sleeve 64 in manner to transmit driving power therefrom to a meshing gear 72 secured to a jack shaft 73 rotatably journalled in the column 12 in parallel relationship with the shaft 62 and constituting an element of the intermediate range changing mechanism B. The primary element of the intermediate range changing mechanism is constituted by a gear 74 which is slidably mounted on a splined rearward portion of the shaft 62 for selective longitudinal shifting movement thereon. As shown in Fig. 2, the gear 74 has been shiftably positioned to engage a complementary gear 75 secured to the jack shaft 73 in manner to transmit driving power from the gear 71, through the gear 72 and the jack shaft 73 to drive the spindle driving shaft 62 in an extremely low range of speeds. For driving the shaft 62 in a higher speed range, the gear 74 may be moved rightwardly in manner that an internal gear 76 formed therein directly engages the teeth of the gear 71 in the manner of a clutch.

From the shaft 62, power is transmitted through a couplet 78 slidably splined on the rightward end 79 of the shaft 62 and constituting the final range changing mechanism C which is arranged to drive the tool spindle 16 in a high or a low range of operating speeds. The couplet 78 comprises a small gear 80 and a large gear 81 joined together and mounted for longitudinal sliding movement on the shaft 62 into meshing engagement alternatively with a low range driving gear 83 or a high range driving gear 84, respectively, which are splined directly to the spindle 16.

As hereinbefore mentioned, the gears of the intermediate range changer B and the range changer C are positionable in a plurality of positions for transmitting driving power from the splined sleeve 64 to rotate the spindle 16 at any one of three distinct speed ranges including a low, intermediate and a high range. To drive the spindle 16 through the lowest range of operating speeds, the range changers B and C are positioned as shown in Fig. 2, with the gear 74 engaging its complementary driving gear 75 and the gear 80 of the couplet 78 engaging its complementary low range spindle driving gear 83. For driving the spindle 16 through an intermediate range of speeds, the gear 80 of the couplet 78 is retained in meshing engagement with the low range spindle drive gear 83 and the gear 74 is shifted rightwardly in manner that the internal gear 76 formed therein engages the complementary gear 71 thereby locking the sleeve 64 to the shaft 62. Thus, in the low and intermediate ranges constituting the lowest sixteen speeds, driving power is transmitted from the small spindle driving gear 80 to the large spindle driving gear 83. To drive the spindle 16 at the high range of operating speeds, the gear 74 is retained in its rightwardly shifted position in clutching engagement with the driving gear 71, and the couplet 78 is shifted leftwardly in a manner that the gear 81 is in meshing engagement with the high range spindle driving gear 84. The large gear 83 has the effect of a flywheel and tends to reduce to a minimum minor fluctuations in cutter speed which might occur as the individual teeth of a cutter engage a workpiece.

The speed changing device A functions to provide a series of eight different driving ratios in step by step arrangement within each of the three distinct speed ranges effected by the combined positioning of the range changers B and C and including a low, intermediate and high speed range so proportioned as to provide progressive steps without overlapping or discontinuity between the ranges. By this combination of the speed changing device A with the intermediate speed range changer B and the range changer C, it is possible to predeterminately position the shiftable gearing contained therein for operating the tool spindle 16 at any one of twenty-four speeds arranged in approximate geometrical progression.

A principal advantage of the improved variable speed transmission mechanism illustrated in Fig. 2, is the provision of a wider than usual range of output speeds effected by arranging the transmission to have a graduated power transmitting capacity in manner to transmit the full power of a relatively high powered spindle driving motor at the higher rates of speed. Generally, in variable speed transmissions of the shiftable gear type, there is a definite limitation in the overall range of allowable output speeds, particularly when a relatively high powered constant speed motor is utilized as a source of power. Included among the main factors determining the upper and lower limits of the allowable range of output speeds are the input power of the driving motor, as well as the space allowable for a transmission disposed to be selectively adjustable for transmitting as many output speeds as possible within a selected range. As is well known in the art, an inherent characteristic of any shiftably geared transmission is the wide variation in torque exerted through the various gears and shafts comprising the transmission as the transmission is adjusted to drive the tool spindle at different rates of speed. Assuming that the full power of a constant speed motor is applied to drive a shiftably geared transmission, the torque on the various gears and shafts thereof will be increased as the transmission is adjusted downwardly to drive a tool spindle at lower rates of speed. Conversely, as the transmission is adjusted upwardly to drive a tool spindle at higher rates of speeds, the torque on the various movable members thereof will be decreased.

Until recent years, when improvements in cutting tools necessitated a considerable increase in spindle driving power, the power required to rotate a cutter spindle for removing metal from a workpiece with maximum efficiency has been considerably less than is now required in utilizing the improved methods of performing a cutting or machining operation. Thus, with the lesser requirements of spindle driving power in prior types of machine tools, the variations in torque effected as a shiftably geared spindle driving transmission was adjusted through a complete range of driving speeds imposed no serious load conditions tending to exceed the power transmitting capacity of the transmission. In a milling machine of a specified size therefore, the transmission mechanism could be so arranged as to provide as wide a range of spindle driving speeds as necessary while transmitting the full power of the spindle driving motor for driving the cutter spindle with maximum efficiency in performing a cutting operation on a workpiece suited to the size and capacity of that particular machine.

With the advent of improved techniques in the utilization of milling machine cutters and the attendant increase in the rate at which metal could be removed from a workpiece, however, the variations in torque on the various rotatable members of a variable speed transmission mechanism imposed a serious restriction on the allowable range of spindle driving speeds. With the available input driving power for the cutter spindle trebled or quadrupled, for example, to more fully utilize the improved methods of removing metal from a workpiece, it was necessary to strengthen the various rotatable members of a shiftably geared spindle driving transmission mechanism to effectively transmit the full power of the driving motor through a selected range of speeds. The overall range of output speeds however, was necessarily restricted and did not provide for an extremely low series of spindle driving speeds because of the excessive torque developed, in the event the full capacity of the higher powered motor were applied. Inasmuch as a milling machine is usually so proportioned as to accommodate a range or class of work within the power capacity of the motor when the spindle is driven at the higher rates of speeds, there are structural and economic limitations preventing the construction of a variable speed transmission having sufficient capacity to transmit the full power from a relatively high powered motor at extremely low rates of speed.

A primary advantage of this invention is the provision of a compactly arranged variable speed transmission having operating characteristics that provide for transmitting the full power of a relatively high powered driving motor to drive the tool spindle with a higher degree of torque than has heretofore been practicable, for faster removal of metal at the high speed rates. In addition to this, the transmission is so arranged as to be selectively adjustable throughout a wide range of spindle driving speeds extending downwardly through a series of extremely low operating speeds in a manner to increase the operational flexibility of the machine for performing the largest possible variety of cutting operations. The transmission is necessarily limited in its power transmitting capacity at the lowest output speeds because of the before-mentioned limitations imposed by the overall size and capacity of the machine, the extremely high powered spindle driving motor and the variations in torque on the various rotatable members of any shiftably geared transmission which occur as the output speed thereof is selectively adjusted throughout its complete range of allowable speeds. In normal machine operation, however, this reduced power transmitting capacity of the variable speed transmission at the lowest output speeds is still fully adequate to drive the cutter spindle for performing cutting operations on a class of work within the range of the machine. Although incorporating this arrangement for widening the allowable range of output speeds greatly increases the operational flexibility of the machine, it is necessary to protect the transmission mechanism against excessive torque when adjusted to drive the tool spindle at the lowest driving speeds. To this end, there is provided an improved automatic torque limiting control arranged to deenergize the work feeding motor on the occurrence of a predetermined degree of load on the spindle driving motor.

Referring again to Fig. 2, the improved variable speed transmission mechanism there shown, is arranged to have sufficient torque transmitting capacity to transmit the full power of the relatively high-powered spindle driving motor 18 whenever the transmission is adjusted to drive the tool spindle 16 at a selected speed in either the high, the intermediate or portions of the low speed range. When the transmission is adjusted to drive the spindle 16 within the lowest range of operating speeds however, it will be apparent that the mechanical advantage effected by engaging the intermediate range change gear 74 with the low speed driving gear 75 will greatly increase the torque on the low speed driving gear 80 and its meshing spindle gear 83 if the full power of the motor were applied at the lowest driving speeds. With the gear 74 engaging the gear 75 to drive the spindle 16 throughout the lowest operating range, the greatest mechanical advantage, and, consequently, the highest torque on the spindle driving gears would occur during the lowest of the eight stepped driving ratios obtainable by selectively shifting the gearing in the speed changing device A. As a result of the increased mechanical advantage on the spindle driving gears 80 and 83, the power transmitting capacity of the entire variable speed transmission mechanism is greatly reduced in the lowest of the eight stepped speed ratios available in the low range.

In accordance with this invention, there is provided an improved torque limiting control arranged to deenergize the work feeding motor on the occurrence of a predetermined degree of load on the spindle driving motor, thus stopping continued work feeding movement of the table to relieve an overload condition on the spindle driving transmission at any selected output speed. The torque limiting control comprises a pair of instantaneous overload control relays which the predeterminately adjusted and individually connectable to be actuated on the occurrence of different predetermined degrees of load on the spindle driving motor. One of the torque limiting control relays is arranged to be responsive to overload conditions exceeding the rated capacity of the spindle driving motor and is rendered operative whenever the transmission mechanism is adjusted to drive the tool spindle at one or another of the nineteen highest operating speeds. This relay functions primarily to protect the transmission against transmitting excessive torque when the transmission is operative to transmit the full power capacity of the motor. Secondarily, this relay functions to protect the spindle driving motor against sudden or shock overloads. The other of the instantaneous overload control relays is responsive to overload conditions which exceed the torque transmitting capacity of the transmission mechanism when operating at greatest mechanical advantage at the lowest driving speeds and is rendered operative whenever the transmission is selectively adjusted to drive the tool spindle at one or another of the five lowest operating speeds. To selectively control the relays constituting the torque limiting control device, the speed selecting crank 21 shown in Figs. 1 and 9, is operatively connected to render one or the other of the relays operative, depending on whether the crank 21 has been moved to adjust the variable speed transmission mechanism for driving the tool spindle in the five lowest or in the nineteen highest of the twenty-four available operating speeds.

Thus, in the event any overload exceeding the torque transmitting capacity of the transmission occurs as a workpiece mounted on the table 15 is fed to a cutter mounted on the spindle 16, the torque limiting control is operative through the appropriate relay to deenergize the work feeding motor 25. The resultant cessation of feeding movement of the work table will relieve the excessive torque on the variable speed transmission mechanism regardless of whether the transmission is operating at either its reduced power transmitting capacity or at its full power capacity. The spindle motor can then rotate freely until the overload condition has been corrected, at which time the feeding motor can be restarted to resume feeding movement of the work supporting table 15.

The control mechanism for shifting the various sliding gear couplets and gears to effect the changes in the spindle driving ratio is similar to that disclosed in U. S. Patent No. 2,240,973 dated May 6, 1941. This mechanism includes a cam actuated gear shifting apparatus constituting a mechanical linkage arranged to be directly operated by the speed selecting crank 21, and functioning to positively shift the sliding gears of the variable speed device A in such a manner that the eight speeds of the series may be effected in predetermined order. One complete revolution of the crank 21 is required for each gear shifting movement of the speed changing device A or a total of eight revolutions of the crank are required to effect a complete transit of the eight stepped driving ratios available therethrough.

In order to obtain the complete series of twenty-four spindle driving speeds available with the combined coordinated positioning of the speed changing device A and the range changers B and C, a total of twenty-four revolutions of the crank 21 are required. Coordinately with the three repetitive series of shifting movements of the speed changing device A, the crank 21 is operatively connected to effect a coordinated shifting movement of the intermediate range changing mechanism B. The shifting mechanism operative on movement of the crank 21, is so arranged that the gears are shifted in a manner to avoid possibility of locking the mechanism by engaging more than one gear on the primary shaft 48 or more than one gear on the secondary element 64 with a cooperating gear of the idler cluster 60, and in a manner that the intermediate range change gear 74 is in its low range driving position during the first of the three repetitive series of shifting movements of the speed changer A. For the last two series of shifting movements of the speed changer A, the gear 74 is retained in its high range driving position.

As shown in Fig. 4, the speed selecting lever or crank 21 is fixed on the outer end of a shaft 89 that is journalled in the control panel 41 concentric with the speed indicating dial 24 and is provided at its inner end with a pinion 90. The pinion 90, in turn, meshes with a gear 91 formed on the periphery of a primary speed changing cam 92 fixed on a stub shaft 93 which is journalled in the control panel 41. As shown in Figs. 4 and 5, the cam 92 is provided on its inner face 94 with a cam track 95 disposed to cooperate with diametrically disposed cam followers 96 and 97, respectively.

The cam follower 96 is carried by one end of a shifting arm 101 that is journalled by means of a forked portion 102 on the inner side of the control panel 41 and engages at its other end with a shifting fork 103 slidably mounted on guide rods 104 and 105 carried by the speed box 39. As shown in Figs. 2 and 4, the shifting fork 103 extends between the gears 55 and 56 of the couplet 49 in the primary shifting element and is operative on movement of the shifting arm 101 by the cam groove 95 acting upon the cam follower 96 to shift the gear 55 or the gear 56 into meshing engagement with the respectively cooperating gears 57 or 58 of the idler cluster 60.

The cam follower 97 is carried on one arm of a bell crank shifting lever 106 journalled by means of a forked arm 107 on the inside of the control panel 41 and that engages with the end of its other arm 108 a shifting fork 109 also slidably mounted on the guide rods 104 and 105, as shown in Fig. 5. The shifting fork 109 is generally similar to the fork 103 and is engaged in an annular groove formed in the hub of the couplet 47 in the primary element, Fig. 2, for shifting the gears 46 or 50 into engagement with the gear 51 or the gear 52, respectively of the idler cluster 60. As shown in Fig. 5, the cam groove 95 is provided with a semicircular section which functions to retain one of the couplets in neutral position while the other couplet is being shifted one way or the other by the remaining nonconcentric portion of the cam groove, thereby avoiding engagement of both couplets with the idler cluster at the same time.

For shifting the gears slidably mounted on the splined sleeve 64 constituting the secondary element of the variable speed device A, there is provided a secondary cam 112 secured to a sleeve 113, Fig. 4, journalled by means of a bearing 114 on a stub shaft 115 secured to the inner side of the control panel 41 directly above and parallel to the shaft 93. The secondary cam 112 is operatively connected with the primary cam plate 92 by means of intermittent gearing constituting a Geneva movement arranged in such a manner that the cam plate 112 is turned through one half of a revolution at the end of each complete revolution of the primary cam plate 92. As shown in Figs. 4 and 5, the cam plate 92 is provided on its periphery, besides but spaced from the gear 91, with a discontinuous gear element 116, the teeth of which mesh with a mutilated gear 117 secured on the outer end of the sleeve 113 and cooperating therewith in a manner to effect the desired intermittent movement of the cam 112 secured thereto.

As shown in Figs. 5 and 7, the secondary cam 112 is provided in the inward face thereof with a cam track 118 that is engaged by cam followers 119 and 120. The cam follower 119 is secured to a shifting fork 121 that is slidably mounted for longitudinal shifting movement on parallelly spaced guide rods 122 and 123 carried by the speed box 39. In a similar manner, the cam follower 120 is secured to a shifting fork 124 which is also slidably mounted on the guide rods 122 and 123 for longitudinal shifting movement. The forward ends of the shifting forks 121 and 124 are disposed to engage annular grooves 125 and 126, Fig. 7, formed on the hubs of the gears 65 and 66 of the secondary element for respectively shifting the gears into engagement with the cooperating gears 52 and 59 of the idler cluster 60.

The gearing interconnecting the speed selecting crank 21 with the cam plates 92 and 112 is so proportioned that for each revolution of the crank, one of the gears of the variable speed device A is shifted to effect a change from one speed to the next. Therefore, eight revolutions of the crank 21 are required to effect all of the eight combinations of gearing available and which result from coordinately rotating the primary cam 92 through two complete revolutions and the secondary cam 112 through one revolution.

For shifting the gear 74 of the intermediate range changer B in coordinated relationship with the shiftable gearing of the speed changing device A, as shown in Figs. 5 and 7, there is provided a tertiary cam 130 rotatably journalled on a stub shaft 131 secured to the inner side of the cover plate 41 in parallel relationship to the stub shafts 93 and 115. The cam 130 is also operatively connected with the primary cam 92 by means of intermittent gearing constituting a Geneva movement arranged in such a manner that the cam 130 is rotated through one third of a revolution at the end of each two full revolutions of the primary cam 92. As shown in Figs. 4 and 5, the secondary cam drive sleeve 113 carries a discontinuous gear element 132, the teeth of which mesh with a mutilated gear 133 carried by the tertiary cam 130 and cooperating in a manner to effect the desired intermittent movement thereof.

The tertiary cam 130 is provided in the inner face thereof, with a cam track 134 that is engaged by a cam follower 135. The cam follower 135 is secured to a shifting arm 136 which has one end journalled on a stub shaft 137 secured to the inner side of the control panel 41. The opposite end of the shifting arm 136 is arranged to engage a shifting fork 138 slidably mounted for longitudinal shifting movement on a guide rod 139 carried by the speed box 39. The forward end of the shifting fork 138 is disposed to engage an annular groove 140 formed on the hub of the gear 74 for effecting leftward movement of the gear 74 into meshing engagement with the cooperating driving gear 75 or rightward movement of the gear 74 in manner that the internal gear 76 formed therein is in engagement with the gear 71.

As hereinbefore indicated, eight revolutions of the crank 21, Fig. 1, are necessary to position the shiftable gearing in the speed changing device A for obtaining the eight stepped speed ratios available therethrough. A total of twenty-four revolutions of the crank 21 are required to obtain the three repetitive series of shifting movements of the gearing contained within the speed changing device A in order to obtain the complete series of twenty-four speed ratios available with a coordinated positioning of the speed changing device A, together with the range change changing mechanisms B and C.

In order to effect a coordinated positioning of the range changer B with a selected positioning of the speed changing device A, the gearing interconnecting the crank 21 with the cam 130 is so proportioned that for twenty-four revolutions of the crank 21, the cam 130 is rotated through one complete revolution.

For the first eight revolutions of the crank 21, coinciding with one series of eight shifting movements of the speed changing device A, the cam 130 is rotated through one third of a revolution during which time the gear 74 is in engagement with the gear 75. At the completion of eight revolutions of the crank 21, the cam track 134 of the tertiary cam 130 and its cooperating follower 135 operate to move the arm 136 rightwardly in a manner that the internal gear 76 formed in the gear 74 is shifted rightwardly into engagement with the complementary gear 71. The cam track 134 is so formed that the internal gear 76 is retained in engagement with the gear 71 during the last sixteen revolutions of the crank 21. During this time, the cam 130 is rotated through two thirds of a revolution and the gearing in the speed changing device A is adjusted through two complete series of shifting movements.

In order to effect shiftable adjustment of the range changing mechanism C, there is provided the independently movable range change lever 20 secured to a shaft 144 journalled in the control panel 41, as shown in Figs. 4 and 5. A shifting crank arm 145 secured to the inner end of the shaft 144 is disposed to engage with its outer end a vertical groove 146 formed in a shifting fork 147 which is slidably mounted for longitudinal shifting movement on the guide rod 139. The forward end of the shifting fork 147 engages an annular groove formed in the hub of the couplet 78 and is selectively movable to effect shifting movement of the gears 80 and 81, constituting the couplet, into meshing engagement with the cooperating spindle driving gears 83 and 84, respectively.

In order to obtain the three driving ranges required for the complete series of twenty-four spindle driving speeds available, the range change lever 20 is so positioned that the low range gear 80 meshes with the spindle driving gear 83 during the first sixteen revolutions of the crank 21. For the last eight revolutions of the crank 21, the lever 20 is shifted to effect meshing engagement of the high range gear 81 with the spindle driving gear 84. For positioning the range change lever after it has been turned to shift the gearing, the lever 20, as shown in Figs. 1 and 4, is provided with an operating knob 149 and latching device constituted by a spring pressed latching plunger (not shown) that is adapted to enter locating holes 150 or 151 in the control panel 41 and that provide for securing the lever 21 in a low or high range operating position respectively.

In a similar manner, for retaining the speed selecting crank 21 in a predetermined coordinated position of adjustment with the range change lever 20, the crank 21 likewise is provided with an operating knob 153 and latching device constituted by a spring pressed latching plunger 154 that is adapted to enter a locating hole 155 in a stationary member constituting part of the control panel 41, as shown in Figs. 1 and 4.

The speed indicating device or dial 24 is mounted for rotation in the control panel 41 concentrically with the speed selecting crank 21 and carries a continuous circular indicating scale constituted by speed indicia 156 arranged in approximate geometrical progression. As shown in Fig. 4, the indicating dial 24 has secured to its inner side a ring gear 157 which meshes with a cooperating pinion 158 secured to the outer end of the primary cam operating shaft 93 whereby the speed indicating dial is operatively connected with the speed selecting crank 21 for movement in predetermined coordinated relationship with the gear shifting control cams 92, 112 and 130. The gearing interconnecting the dial 24 with the crank 21 is so proportioned that twenty-four revolutions of the crank are required to effect one complete revolution of the dial. Each turn of the crank 21 effects an incremental advancement of the dial 24 corresponding to one of the twenty-four speed indicia 156 into which the continuous circular indicating scale carried thereby is divided.

For determining the selected spindle operating speed effected by a combined positioning of the range change lever 20 and the speed selecting crank 21, the speed indicating dial 24 is arranged to cooperate with either of the diametrically opposed indicating plates 22 or 23 formed on the hub of the range change lever 20. The range change plate 23 indicating the low range position of the lever 20 is preferably colored to conform to the color of the speed indicia divisions on the dial 24 indicating the lower sixteen spindle operating speeds. The plate 22 indicating the leftwardly shifted or high range position of the range change lever 20 is likewise colored to conform to the divisions on the dial 24 indicating the eight highest spindle operating speeds.

In order to facilitate the shifting of gears on rotation of the range change lever 20 or the speed selecting crank 21, the control station 32 at the side of the column is provided with an inching control button 159, shown in Fig. 1, which is connected through a timing mechanism to effect a momentary energization of the spindle driving motor for slowly revolving the speed changing transmission gearing as more fully explained in the aforementioned U. S. Patent No. 2,497,842.

In order to provide a uniform rate of spindle rotation at any of the speeds available by a coordinated adjustment of the range change lever 20 and the speed selecting crank 21, a heavy flywheel 162 is secured to the rearward end of the spindle 16, as is shown in Fig. 2. The flywheel functions to reduce to a minimum any slight fluctuations of spindle speed which might occur, for example, at the moment of impact as an individual cutting tooth of a cutter mounted on the spindle 16 enters a workpiece carried by the table 15 in the performance of a cutting operation.

To properly center and position the flywheel 162 on the spindle 16, the rearward end of the spindle is provided with a slight taper 163 disposed to cooperate with a complementary internal taper formed toward the inner end of a bored hole extending through the flywheel. For securing the flywheel to the spindle, the spindle 16 is provided with a splined end portion 165 disposed to receive a locking plate 166 having a complementary splined opening and secured to the flywheel by means of cap screws 167 and dowels 168. A locking nut 169 is threaded on the rearward end of the spindle 16 in a manner to retain the flywheel in locked engagement therewith.

A schematic representation of an electric circuit arranged to coordinately control the spindle driving motor 18 and the work feeding motor 25 is shown in Fig. 9. Electrical energy for operating the motors is derived from line conductors $L_1$, $L_2$ and $L_3$ which are connected to a source of power by a disconnecting switch 173 in the usual manner. In order to operate the motors, it is necessary to energize a low voltage control circuit contained in a control cabinet 174 which receives electrical energy through a transformer (not shown) mounted in the cabinet and connected by conductors 176 and 177 to two of the main supply lines $L_1$ and $L_3$ in the usual manner. The control circuit within the cabinet 174 is generally similar to the control circuit shown in the aforementioned U. S. Patent No. 2,497,842 and is selectively actuatable to energize a feed motor control circuit represented by light lines in the drawings.

The control circuit in the cabinet 174 may be energized or deenergized selectively by depressing a master switch start button 178 or a master switch stop button 179, respectively.

In order to energize the spindle motor 18 for either clockwise or counterclockwise rotation, a selectively positionable reverser lever 180 is operatively connected to position a forward or reverse switch interconnected in the control circuit within the control cabinet 174, as more fully described in the aforementioned copending patent application.

With the reverser lever 180 positioned to provide forward rotation of the spindle motor 18 and the master switch start button 178 depressed to energize the control circuit, the spindle motor 18 may be energized by depressing a start button 181 carried by the control station 32. The start button 181 is operatively connected to energize a star-delta stepping circuit, interconnected in the control circuit, which operates to provide a gradual or stepped acceleration of the spindle motor 18 in well known manner. Power for driving the spindle motor 18 is derived from the main supply lines $L_1$, $L_2$ and $L_3$ through conductors 182, 183 and 184 connecting with the star-delta stepping circuit in the control cabinet 174. From the control cabinet, groups of conductors 185, 186, 187, 188, 189 and 190 are so interconnected between the star-delta stepping circuit and the main drive motor 18 as to effect energization of the motor 18 for rotation at an intermediate starting speed and after a predetermined time interval, at full operating speed. A pair of solenoidal coils respectively associated with a pair of instantaneous overload relays 191 and 192 are operatively interconnected in the motor circuit by means of the conductor 185 for actuation on different predetermined degrees of load on the spindle driving motor 18. As will hereinafter be explained, the overload relays 191 and 192 are alternatively operable to deenergize the feed motor 25 on the occurrence of different degrees of load on the spindle motor 18.

After the spindle motor 18 has reached full operating speed, the feed motor 25 may be energized by again depressing the start button 181 to energize the feed motor control circuit represented by light lines in the drawings. The control circuit within the control cabinet 174 is so arranged that the feed motor 25 cannot be energized until the spindle motor 18 has reached its full operating speed. Depressing the start button 181 a second time then effects a flow of control current from the circuit in the control cabinet 174 through a conductor 193 and a contact plate 194 of a normally closed thermal overload relay 195 associated with the spindle motor 18. From the contact plate 194, the current flow continues through a conductor 196 and a contact plate 197 of a second normally closed thermal overload relay 198 for the spindle motor, to a conductor 199. A contact plate 204 of a normally closed thermal overload relay 205 associated with the feed motor 25 transmits current from the conductor 199 to a conductor 206 connecting with a contact plate 207 of another normally closed thermal overload relay 208 associated with the feed motor. From the contact plate 207, the current is transmitted by a conductor 209 to energize a solenoidal coil 210 that actuates a starting relay 211 for the feed motor 25. Movement of the feed motor starting relay 211 to its closed position effects an operative connection from the main supply lines $L_1$, $L_2$ and $L_3$, through, respectively, closed contact plates 213, 214 and 215 to conductors 216, 217 and 218 for energizing the feed motor 25.

The return line from the solenoidal coil 210 of the feed motor relay is completed through a conductor 219, and a conductor 220 connecting with a normally closed contact plate 221 of the instantaneous overload control relay 192 associated with the spindle motor 18. From the contact plate 221, the current continues through a conductor 223, a normally closed contact plate 224 of the instantaneous relay 191 associated with the spindle motor, a conductor 226, and a conductor 227 constituting the return line connecting with the control circuit in the control cabinet 174.

In the event of a gradually increasing sustained overload on either the spindle motor 18 or the feed motor 25, one or another of the thermal overload relays 195, 198, 205 or 208 respectively associated therewith will be actuated to an open position effecting an interruption in the flow of current to the solenoidal coil 210 of the feed motor relay 211. Deenergization of the coil 210 in turn will permit the relay 211 to drop to an open position effecting an interruption in the flow of current from the main supply lines $L_1$, $L_2$ and $L_3$ to the feed motor 25. With the feed motor deenergized, feeding movement of the work supporting table will be stopped while permitting free rotation of the spindle motor 18 to correct the overload condition.

In accordance with this invention, as hereinbefore mentioned, there is provided an improved torque limiting control disposed to protect the variable speed transmission mechanism constituted by the speed changing device A, the range changer B and the range changer C against varying degrees of torque which exceed the graduated power transmitting capacity thereof. The torque limiting control is constituted in part by the instantaneous overload control relays 191 and 192 which are predeterminately adjusted and individually connectible to deenergize the work feeding motor 25 on the occurrence of different predetermined degrees of load on the spindle motor 18. Thus, in performing a cutting operation, an overload condition exceeding the predetermined safe torque transmitting capacity of the transmission might occur, for example, as a cutter mounted on the spindle 16 came in cutting engagement with a hard spot on a workpiece carried by the table 15. One or the other of the relays 191 and 192 would then be actuated to effect deenergization of the feeding motor 25 with a resultant cessation in feeding movement of the table 15. The spindle could then rotate freely, relieving the excessive torque on the transmission mechanism until the adjustments necessary to prevent a reoccurrence of the overload condition had been effected, at which time the feeding motor 25 could be restarted to resume the feeding operation. The speed selecting crank 21 is operative to effect a selective connection of one or the other of the instantaneous relays 191 and 192 for alternative operation depending upon the power transmitting capacity of the transmission, as determined by the selected output speed resulting from the coordinated positioning of the speed selecting crank 21 and the range change lever 20.

The instantaneous overload control relay 192 is predeterminately adjusted to be actuated to an open position on the occurrence of a degree of load on the spindle motor 18 which is approximately one half the rated capacity thereof. Since the relay 192 is connected in series with the relay 191 in the return line from the solenoidal coil 210 of the feed motor relay 211 through the conductors 219, 220 and 223, opening of either the relay 191 or the relay 192 will interrupt the flow of current to the coil 210 to effect deenergization of the feed motor 25. The instantaneous overload relay 192 is operatively connected in the return line from the feed motor relay coil 210 whenever the speed change crank 21 and the range change lever 20 are coordinately adjusted to drive the spindle 16 at any of the five lowest operating speeds, as indicated by the sector of the speed indicating dial between the dotted lines 229 and 230 in Figs. 1 and 9.

The instantaneous overload control relay 191 is predeterminately adjusted to be actuated to an open position on the occurrence of a degree of load on the spindle motor 18 which is approximately equivalent to the rated capacity thereof. Whenever the speed selecting crank 21 is positioned to effect an adjustment of the variable speed transmission mechanism for driving the spindle 16 at one or the other of the highest nineteen operating speeds, only the relay 191 is operatively connected to effect deenergization of the feeding motor 18.

In order to effect an alternative connection of either the torque limiting control relay 191 or the relay 192 for deenergizing the feeding motor 25, there is provided an arcuately formed cam 231 secured to the inner face 232 of the rotatably mounted speed indicating dial 24 adjacent to the outer periphery thereof as indicated in Fig. 6.

As schematically represented in Fig. 9, the cam 231 is rotatable with the dial 24 in manner to retain an axially slidable actuating plunger 233 carried by the control panel 41 in its outwardly urged position as the speed changing crank 21 is rotated to drive the spindle 16 at any one of the five lowest operating speeds indicated by the sector between the dotted lines 229 and 230. The plunger 233, in turn, operates to retain an actuating plunger 234 of a normally closed switch 235 in a depressed position in manner that the normally closed contact plate 236 therein is in its open or disconnected position.

As the crank 21 is rotated to drive the spindle 16 at any selected speed other than the lowest five speeds indicated by the sector between the dotted lines 229 and 230, the cam 231 carried by the speed indicating dial 24 will be rotated out of engagement with the actuating plunger 233. The plunger 233 will then be urged inwardly by the resilient action of a spring 237, allowing the contact plate 236 to return to its normally closed position bridging the contacts or terminals 238 and 239 contained therein and shunting out the relay 192.

With the contact plate 236 of the switch 235 in closed position, only the instantaneous relay 191 will be operative to deenergize the feed motor 25 on the occurrence of a degree of load on the spindle motor 18 which is approximately equivalent to the rated capacity thereof. The return line from the solenoidal coil 210 will then be completed through the conductors 219 and 220 to a shunt conductor 241 connecting with the terminal 238 of the switch 235. Current flow will then continue through the closed contact plate 236 of the switch 235 and through a conductor 242 to the conductor 223 which, in turn, connects with the normally closed contact plate 224 of the instantaneous control relay 191, thereby maintaining the circuit regardless of whether the relay 192 is closed or open.

For effecting a coordinated deenergization of the spindle motor 18 and the feeding motor 25, as well as for effecting a quick stopping of the spindle motor 18, the ocntrol station 32 is provided with a stop button 243. The stop button 243 is connected to effect a sequential operation of a plurality of switches in a manner that a slight inward pressure thereon will effect deenergization of the motors and a further continued inward pressure will operate in conjunction with a zero speed plugging switch (not shown) for effecting a quick stopping of the spindle motor 18 by plugging action.

It will be apparent to those skilled in the art that other types of suitable driving means may be substituted for the feed motor 18 and may be arranged in a similar manner to transmit power through the variable speed transmission mechanism for rotating the spindle 16 at selected speed, and to actuate either of the instantaneous overload control relays 191 or 192 selectively for deenergizing the feeding motor 25 to protect the transmission against excessively high torque at any of the available output speeds. In the fragmentary electrical circuit diagram in Fig. 8, which may be substituted for the lower part of the diagram in Fig. 9, there is shown a modification of the invention incorporating a spindle driving motor 246 disposed to be operatively energized through the usual three wire connection constituted by the conductors 247, 248 and 249 in well known manner.

As schematically represented by the modified circuit diagram shown in Fig. 8, taken in conjunction with the diagram shown in Fig. 9, electrical energy for operating both the feeding motor 25 and the spindle motor 246 is derived from the line conductors $L_1$, $L_2$ and $L_3$. To operate the motors, it is necessary to energize a low voltage control circuit contained in a control cabinet 250 which receives electrical energy through a transformer (not shown) in the cabinet connected by the conductors 176 and 177 to the main supply lines $L_1$ and $L_3$. The control circuit in the cabinet 250 is generally similar to the control circuit contained in the cabinet 174 and may be energized or deenergized by depressing the master switch start button 178 or the master switch stop button 179, respectively.

With the master switch start button 178 depressed to energize the control circuit, the spindle motor 246 and the feeding motor 25 may be coordinately energized by depressing the start button 181 which, in turn, is connected to actuate a holding circuit interconnected in the control circuit for operating the motors. Power for operating the spindle motor 246 is derived from the main supply lines $L_1$, $L_2$ and $L_3$ through the conductors 182, 183 and 184, as shown in Fig. 9, connecting through the holding circuit in the control cabinet 250, Fig. 8, with the conductors 247 and 248 and a conductor 251, respectively. As shown in Fig. 8, the conductors 247 and 248 are connected directly to the spindle motor 246, and the conductor 251 is connected through the solenoidal coil of the instantaneous overload relay 191 to a conductor 252. The conductor 252, in turn, is connected through the solenoidal coil of the instantaneous overload relay 192 to the conductor 249 connecting with the spindle motor 246.

To effect a coordinated energization of the feeding motor 25, current flows from the control circuit in the control cabinet 250 through the conductor 193 and, as shown in Fig. 9, through the contact plates of the thermal overload relays 195, 198, 205 and 208, respectively, to a conductor 209 connecting with the solenoidal coil 210 of the feed motor relay 211.

As hereinbefore mentioned, the circuit through which the current will flow in a return line from the solenoidal coil 210 of the feed motor relay 211 is determined by the adjusted position of the speed selecting crank 21 and the resultant positioning of the contact plate 236 of the normally closed switch 235. With the crank 21 positioned to adjust the variable speed transmission for driving the spindle 16 at one or another of the five lowest operating speeds, as indicated by the sector of the speed indicating dial between the dotted lines 229 and 230, the return flow of current from the coil 210 will continue through the conductor 219 and the conductor 220 to the contact plate 221 of the instantaneous relay 192. From the contact plate 221, the current flow will continue through the conductor 223, the contact plate 224 of the relay 191, and the conductors 226 and 227 to the feed motor holding circuit in the control cabinet 250.

With the crank 21 positioned to adjust the variable speed transmission for driving the spindle 16 at one or another of the nineteen highest operating speeds, the contact plate 236 of the switch 235 will be resiliently urged to a closed position bridging the contacts 238 and 239 as the cam 231 is rotated out of engagement with the actuating plunger 233. The return flow of current from the solenoidal coil 210 will then continue through the conductors 219 and 220 to the shunt conductor 241 connecting with the contact 238. With the contact plate 236 of the switch 235 in closed position, the current then continues through a conductor 242 to the conductor 223 connecting with the normally closed contact plate 224 of the instantaneous overload control relay 191.

Thus, in the event of the occurrence of a predetermined degree of load on the spindle motor 246 that exceeds the predetermined safe power transmitting capacity of the variable speed transmission mechanism at a selected rate of output speed, one or the other of the instantaneous overload control relays 191 or 192 will be actuated to effect deenergization of the feeding motor 25.

The increased power necessary to utilize the newer metal cutting techniques for achieving faster removal of metal from a workpiece furthermore has the effect of creating a considerable increase in cutting pressure as a workpiece mounted on the table is fed to a cutting tool mounted on the tool spindle. This effect is further magnified by the increased rate of speed at which the workpiece is fed to the cutter for obtaining maximum efficiency. The increase in cutting pressures resulting from driving the cutter spindle with greater power and, at the same time feeding the workpiece to the cutter at higher rates of speed, is such that the range of work which could be safely accommodated on some types of prior machines was greatly restricted. If the newer methods of removing metal from a workpiece are used on some of the prior milling machines of the knee and column type, the resultantly increased cutting pressure between the cutting tool and the workpiece operates to cause an excessive deflection of the table supporting knee. As is well known in the art, there is a tendency for the table supporting knee of a milling machine to be deflected laterally in the direction of work feeding movement as well as downwardly and outwardly due to the normal cutting pressures created during a machining operation. Likewise, if the table is used only to position a workpiece for a drilling or boring operation, the knee would be laterally deflected if the table were moved to either of its extreme longitudinally adjusted positions due to the cantilever action caused by the overhang of the table. In a similar manner, but to a lesser degree, the knee would be deflected downwardly and outwardly if the transversely adjustable saddle interposed between the knee and the table were moved to its extreme outer position toward the forward face of the knee. In either event, a workpiece supported on the table would be tilted slightly from its proper relationship with the face of the machine column and with the tool carrying spindle resulting in inaccuracy if a drilling or a boring operation were performed.

To obviate the possibility of the knee of the machine being deflected during the course of a machining operation, there is provided an improved elevating mechanism arranged to provide maximum rigidity for the work supporting table. The improved elevating mechanism is constituted essentially by two elevating screws interposed in longitudinally spaced relationship between the underside of the knee and the forwardly extending base of the column. The elevating screws are disposed to cooperate respectively with complementary nuts contained within the knee in manner to effect a coordinately equalized vertical adjustment of the knee, saddle and work supporting table.

Figure 12:
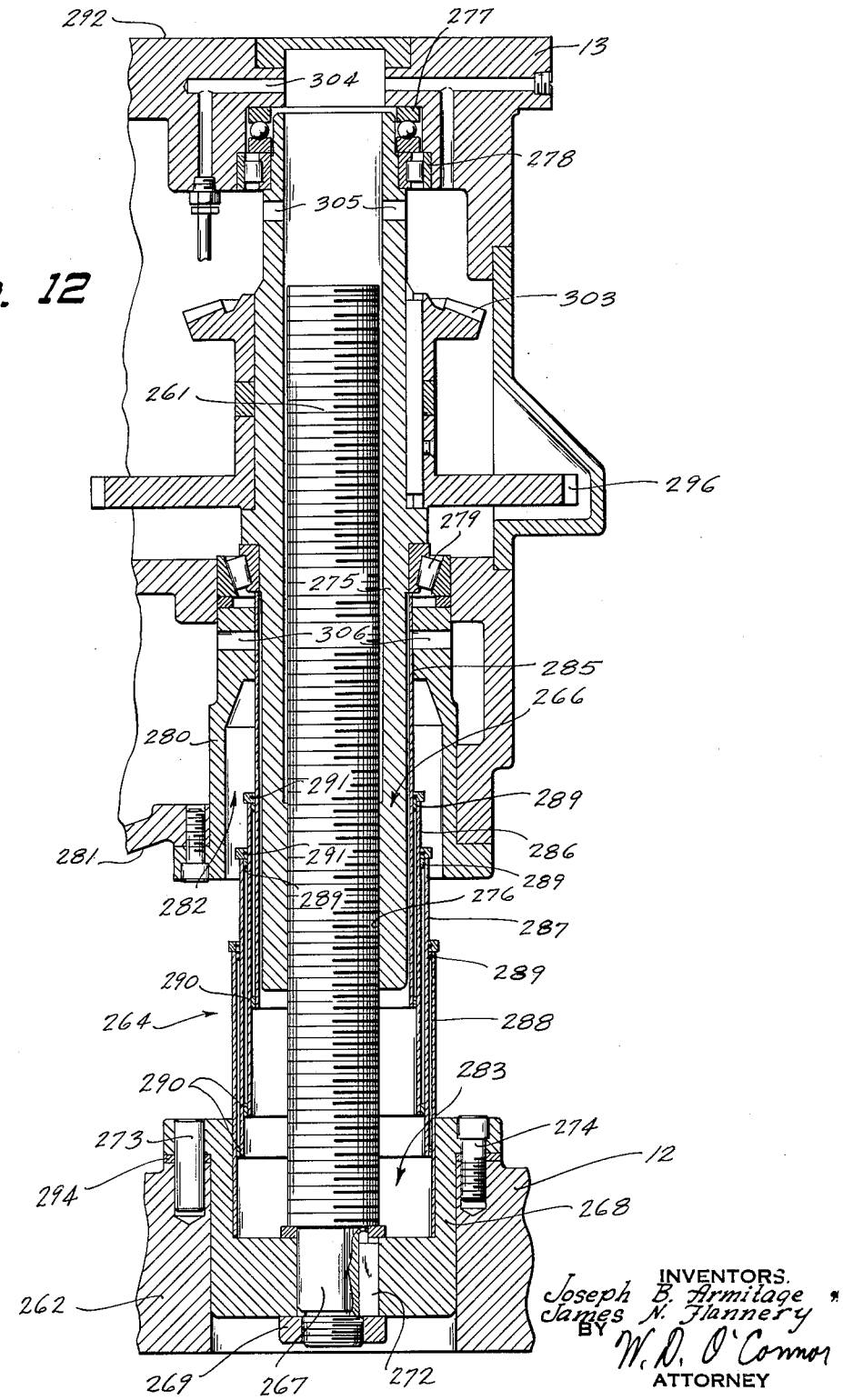
Fig. 12 is an enlarged view in vertical section through the rightward side of the knee and illustrating more fully a part of the improved elevating mechanism shown in Fig. 11.

As hereinbefore indicated, the knee 13 is supported in any selected position of vertical adjustment by means of an improved elevating mechanism comprising essentially two spaced vertically upstanding parallelly disposed elevating screws 260 and 261 interposed between the knee 13 and a forwardly extending base section 262 of the column 12, and respectively contained within a pair of telescoping protective housings 263 and 264, as shown in Figs. 1, 11 and 12. Each of the elevating screws 260 and 261 is nonrotatably secured to the column base 262 and is helically threaded for engagement with one of a pair of complementary internally threaded nuts 265 and 266 respectively journalled in the knee 13. To provide the utmost rigidity for the knee 13, as well as for the saddle 14 and the work supporting table 15 slidably superimposed thereupon, the helically threaded, nonrotatable screws 260 and 261 are positioned in longitudinally spaced parallel relationship along the column base 262 toward the opposite outer sides of the knee 13 and in a plane parallel to the plane in which the table 15 is longitudinally slidable. The screws 260 and 261 with their cooperating nuts 265 and 266 may be spaced apart a distance ranging between one-half the width of the upper surface of the knee 13 to the full width thereof to insure stability of the knee and to minimize lateral deflection. In the preferred construction and as shown in the drawings however, the screws 260 and 261 with their cooperating nuts are spaced apart a distance ranging between five-eighths and three-quarters the width of the upper surface of the knee 13, this being a spacing that will provide stability of the knee member and at the same time make possible a driving mechanism proportioned to rotate the elevating screw nuts in synchronism, as will be hereinafter explained. Since both of the screws 260 and 261 with their cooperating nuts 265 and 266 are of identical construction, only the screw 261 and nut 266 will be described in detail.

As more clearly shown in the enlarged view Fig. 12, the elevating screw 261 is provided with a lower end portion 267 of reduced diameter disposed to be received in a vertically bored hole centrally formed within a circular housing 268 which, in turn, is secured to the forwardly projecting column base 262. The screw 261 is secured to the housing 268 by means of a locking nut 269 and is arranged to be restrained against rotative movement relative to the housing 268 by means of a key 272. To facilitate the proper vertical alignment of the elevating screw 261 relative to its cooperating nut 266 during the initial assembly of the machine, the circular housing 268 is received within an enlarged vertically bored hole formed within the column base 262 and is secured thereto by dowels 273 and screws 274 extending through a flanged portion of the housing to engage the base 262.

The nonrotatable elevating screw 261 extends upwardly to engage its cooperating nut 266 which is formed in the shape of an elongated hollow sleeve 275 having internal screw engaging threads 276 formed only toward the lower end thereof. The nut 266 is journalled within the knee toward the right outer side thereof by means of antifriction bearings 277, 278 and 279, the lower bearing being retained in position by means of an upwardly extending bearing carrier 280 secured to the underside 281 of the knee 13. As shown in Figs. 11 and 12, the lower internally threaded portion 276 of the nut 266 extends downwardly through an enlarged circular recess 282 internally formed in the bearing carrier 280 to project slightly below the underside of the knee 13. Whenever the knee 13 is vertically adjusted to its lowermost position, as shown in Fig. 11, the lower internally threaded end of the nut 266 is disposed to project downwardly into an enlarged internally formed circular recess 283 in the housing 268. It will be noted that, by means of this construction, the elevating screw nut 266 and the elevating screw 261 operate in a telescoping manner to allow a maximum range of vertical movement of the knee 13. When the nut 266 is rotated to adjust the knee 13 upwardly to its maximum limit of vertical adjustment, only the uppermost helical threads of the screw 261 will be in engagement with the complementary internal threads of the downwardly projecting elongated nut 266. As the nut 266 is rotated to adjust the knee downwardly to its lower-most position, the enlarged circular recesses 282 and 283 respectively formed in the bearing carrier 280 and the housing 268 are so arranged as to provide sufficient clearance for the nut 266 to permit maximum downward movement of the knee 13, the limit of downward movement of the knee being positively restricted only by the proximity of the underside 281 of the knee 13 to the top surface of the column base 262.

To protect the elevating screws 260 and 261 from external damage, there are provided the protective telescoping housings 263 and 264 which are secured at their opposite ends to the underside of the knee 13 and to the top surface of the column base 262 in such manner as to telescope therebetween to completely enclose each of the screws in any selected vertically adjusted position of the knee 13. Each of the telescoping housings 263 and 264 are of similar construction and as shown in Figs. 11 and 12, comprise a plurality of telescoping hollow tubes 285, 286, 287 and 288 having their outer diameter so graduated in size that each of the smaller tubes is guidably received in the next larger tube. Shoulders 289 and 290 formed respectively at the upper and lower ends of the tubes are arranged to cooperate to limit the telescoping movement of the tubes and to retain the guidable engagement therebetween. To prevent leakage of coolant into the housing 264 and to prevent leakage of lubricant out of the housing, there are provided circular oil seals 291 associated with the shoulders 289 at the upper ends of each of the tubes. To provide clearance for receiving the telescoping tubes 285, 286, 287 and 288 whenever the knee 13 is adjusted to its lowermost position, the recesses 282 and 283 formed in the bearing carrier 280 and the housing 268 respectively, are so enlarged as to form a hollow enclosure for completely receiving the collapsible telescoping housing 264. This arrangement is particularly advantageous in allowing the knee 13, the saddle 14, and more particularly, the work supporting table 15 to be moved to the lowest possible position within their allowable range of vertical movement as provided for by the operation of the elevating screw 261 and its cooperating internally threaded nut 266.

To retain the upper surface 292 of the knee in a plane that is at right angles to the front face 293 of the column regardless of its vertically adjusted position therealong, and to prevent any deviation in the parallelism of the upper knee surface 292 relative to a predetermined horizontal plane, the nonrotatable elevating screws 260 and 261 are disposed to be engaged at the same relative height above the column base 262 by their cooperating internally threaded nuts 265 and 266, respectively. To achieve this result, and to maintain the parallelism established between the upper knee surface 292 and the forwardly projecting column base 262 during assembly of the machine, there is provided between the flanged shoulder of the housing 268 and the top surface of the column base 12, a circular fitting washer 294 ground to a predetermined size and disposed to elevate the housing 268 and the screw 261 slightly relative to the column base 12. The fitting washer 294 provides a predetermined vertical adjustment of the elevating screw 261 relative to the parallelly disposed screw 260 in manner that the nuts 266 and 265 respectively engaged therewith are at the same relative height above the column base 262 regardless of the relative positions of the helical threads respectively formed on the nut 266 and its cooperating screw 261.

For effecting a coordinated and equalized vertical adjustment of the knee 13, it is necessary that the internally threaded elevating screw nuts 265 and 266 be rotated in synchronism relative to their cooperating nonrotatable elevating screws 260 and 261, respectively. To this end, as shown in Figs. 11 and 13, spur gears 295 and 296 respectively keyed to the rotatable nuts 265 and 266 are disposed to simultaneously meshingly engage a third spur gear 297 operatively interposed therebetween and which is keyed to a vertical shaft 298 located in the central portion of the knee 13 and journalled for rotation in bearings 299 and 301. Rotation of either of the elevating screw nuts 265 and 266 will thus operate to rotate the centrally located spur gear 297 for transmitting power to effect a simultaneous synchronized rotation of the other elevating screw nut. To maintain synchronism between the elevating screw nuts 265 and 266, the pitch circumference of the gears 295 and 296 is so proportioned relative to the lead of the elevating screws 260 and 261 that any lash which might develop between the gears will be reflected by a lineal differential between the relative positions of the nuts that is less than the practical allowable error in the lead of the screws 260 and 261. Thus, any lineal differential which may develop between the relative positions of the nuts 265 and 266 along the screws 260 and 261 will be so immeasurably small that the synchronism established between the elevating screw nuts will not be impaired. The pitch diameter of each of the gears 295 and 296 respectively is approximately five times greater than the diameter of the respective elevating screws 260 and 261, as shown in Fig. 11. Likewise, the transfer gear 297 is preferably identical in size to the driving spur gears 295 and 296. The invention, however, is not to be considered as being restricted to the exact range of dimensions indicated to produce the desired results. To effect rotation of the elevating screw nuts 265 and 266, a pair of bevel pinions 302 and 303 are keyed to the rotatable nuts 265 and 266, respectively, and are disposed to be actuated respectively by manual means or by power driven means at a selected rate of speed.

For lubricating the knee elevating mechanism, lubricating oil is pumped from a sump within the lower central portion of the hollow knee 13, by means of a pump (not shown) through a tube connecting with a drilled line 304 formed in the upper portion of the knee 13, as shown in Fig. 12. A portion of the oil flowing from the drilled line 304 serves to lubricate the bearings 277 and 278 at the top of the elevating screw nut 266 and the balance of the oil flows downwardly into the hollow central portion of the elevating screw nut 266 above the elevating screw 261. Any excess oil collecting within the nut 266 above the screw flows out discharge ports 305 formed in the nut to supply lubricant to the teeth of the bevel gear 303 and the spur pinion 296, as well as the cooperatively meshing teeth of the gears associating therewith. Part of the lubricating oil circulates downwardly into the clearance opening formed between the screw 261 and the upper sleevelike portion 275 of the nut 266 to lubricate the threads of the screw and the cooperatively meshing threads 276 of the nut. After lubricating the cooperating threads of the screw and nut, the oil flows downwardly to collect in the recess 283 formed in the housing 268, toward the lower end of the elevating screw 261. Since the telescoping housing 264 is arranged to form a leakproof enclosure by virtue of the oil seals 291 engaging each of the tubes comprising the housing as hereinbefore explained, the level of oil collecting within the recess 283 may rise within the housing to the level of discharge ports 306 providing for a return flow of oil to the knee sump. Normally, therefore the level of oil between the screw and nut will be above the highest point at which the threads 276 of the nut engage the cooperating threads of the screw 261, as determined by the discharge ports 306. For returning oil within the enclosure formed by the housing 264 at the lower end of the nut 266, clearance is provided between the inner diameter of the upper telescoping tube 285 and the outer diameter of the nut 266 in manner that the level of oil may rise therebetween to the height of the discharge ports 306.

Power for driving the vertically slidable knee 13, the transversely slidable saddle 14 and the longitudinally slidable table 15 at a selected feeding rate or at a rapid traverse rate of speed is derived from the feeding motor 25 located at the rearward right side of the knee 13, as shown in Fig. 13. From the feed motor 25, as schematically shown in Fig. 14, power is transmitted through a shaft 307 to drive a worm 308 secured thereto and which is in meshing engagement with a wormwheel 309. The wormwheel 309 is disposed to rotate a shaft 310 to transmit power to drive a pair of spur gears 311 and 312 respectively secured thereto at a constant rate of speed. The gear 311 is in meshing engagement with a complementary gear 315 secured to a shaft 316 to constitute a constant speed source of power which is selectively connectable to drive the major slidably movable members including the knee, saddle and table at a fast or rapid traverse rate of speed by means of a selectively actuatable clutching mechanism 317. The other spur gear 312 is disposed to mesh with a complementary gear 318 secured to a shaft 319 connected to drive a variable speed transmission mechanism 320 which is suitably located within the central portion of the knee 13. Although the transmission mechanism 320 may be of any variable speed type, it is preferably of the shiftable gear type generally similar to the feed driving transmission mechanism shown in U. S. Patent No. 2,182,421. As hereinbefore explained, the feed selecting lever 30 at the front of the knee 13, shown in Fig. 1, is connected to adjust the variable speed transmission mechanism 320 for driving the knee 13, the saddle 14, and the table 15 at a selected work feeding rate of speed.

Power for movement of the work supporting table 15 relative to the tool spindle 16 in any of its three lines of movement is transmitted through an output shaft 321 operatively driven by the variable speed feed driving transmission mechanism 320 at a rate determined by the setting of the rate selecting lever 30 to three independently operating branches, each including an independent reversing mechanism, by means of a gear 322 disposed to be driven by the shaft 321 and constituting a common driving member. A rollover clutch mechanism 323 interposed between the output shaft 321 and the driving gear 322 is operative in well known manner to transmit power therebetween for driving the gear 322 at a selected work feeding rate whenever the gear 322 is not already being driven at a faster rate of speed.

As schematically shown in Fig. 14, the gear 322 meshes with a gear 326 carried on a shaft 327 which is journalled for rotation in the forward part of the knee 13 and is disposed to carry a second similarly shaped gear 328. The gear 326 meshes with a wide faced gear 329 which is rotatably journalled on a cross traversing shaft 330 journalled for rotation in the forward part of the knee by means of bearings 331, 332 and 333, as shown in Figs. 13 and 14. The other gear 328 carried for rotation by the shaft 327 is disposed to mesh with a wide faced gear 334 which is rotatably mounted on a shaft 335 journalled in the knee in parallelism with the cross traversing shaft 330 to constitute part of a reversing mechanism 336 for rotatably driving the elevating screw nuts 265 and 266.

The wide faced gears 329 and 334 are caused to rotate in the same direction by reason of their meshing engagement with the feed driving gears 326 and 328, respectively. To provide for effecting reversal in the direction of rotation of the cross traversing shaft 330 and the knee reversing mechanism 336, the wide faced gear 334 is disposed to mesh with a gear 337 rotatably journalled on the shaft 330, and the wide faced gear 329 is disposed to mesh with a gear 338 keyed to the shaft 335 for rotation therewith.

By means of this arrangement, the gears 329 and 337 are caused to rotate in opposite directions on the cross traversing shaft 330. In a like manner, the gear 338 keyed to the shaft 335, as well as the gear 334 rotatably journalled thereon, are caused to rotate in opposite directions, the shaft 335 being rotatable only in the same direction as the gear 338.

As shown in Figs. 13 and 14, the cross traversing shaft 330 is provided with a shiftable clutch sleeve 339 that is splined thereon between the oppositely rotating gears 329 and 337 and that is provided at each end with clutch teeth disposed to cooperate with complementary clutch teeth of the gears 329 and 337. The clutch sleeve 339 is shiftable to selectively connect either the gear 329 or the gear 337 to drive the cross traversing shaft 330 in either direction of rotation. The cross traversing shaft 330 is provided toward its inner end with helical threads 340 disposed to engage a cooperating nut 343 secured to a bracket 344 depending from the underside of the saddle 14. The nut 343 and the helically threaded cross traversing shaft 330 journalled in the knee 13 are arranged to cooperate to effect movement of the saddle 14 and the table 15 slidably carried thereby toward or away from the front face of the column 12, depending upon the direction of rotation of the threaded shaft 330, as determined by the shiftably adjusted position of the clutch sleeve 339.

Between the oppositely rotating gears 334 and 338 which are journalled on and keyed to the shaft 335 respectively to constitute the knee reversing mechanism 336, there is provided a slidable clutch sleeve or clutch gear 345 which is journalled on the shaft 335 for rotation independently thereof and which carries a gear 346 disposed to have slidable meshing engagement with a wide faced gear 347 secured to an elevating shaft 348.

As shown in Figs. 13 and 14, the elevating shaft 348 is journalled toward the rightward side of the knee in parallelism with the cross traversing shaft 330 and the gear 347 is disposed to transmit power for rotating the shaft 348 by means of a safety clutch mechanism 349 interposed therebetween. In the event of an excesssive load upon the driven shaft 348, the safety clutch 349 allows slippage relative to the shaft 348 to relieve the driving load on the driving gear 347 and the driving gear train connected therewith. The clutch sleeve 345 is provided at its opposite ends with clutch teeth disposed to engage complementary clutch teeth formed on the adjacent faces of the reversedly rotating gears 334 and 338. Shiftable adjustment of the sleeve 345 into clutching engagement with the gear 334 or the gear 338 will effect power driven movement of the gear 346 in a selected direction of rotation. Since the gear 346 is slidably engageable with the wide faced gear 347, regardless of the shiftably adjusted position of the clutch sleeve 345, power will be transmitted therebetween to rotate the elevating shaft 348 in the one or the other direction selectively. The elevating shaft 348 carries at its forward end, as shown in Figs. 13 and 14, a bevel gear 350 disposed to mesh with the bevel gear 303 keyed to the rotatably journalled elevating screw nut 266. From the elevating shaft 348, power is transmitted through the meshing bevel gears 350 and 303 to effect rotation of the elevating screw nut 266 and, simultaneously therewith, to effect synchronized rotation of the other elevating screw nut 265 due to the meshing engagement of the centrally located spur gear 297 with the spur gears 295 and 296 respectively keyed to the elevating screw nuts as hereinbefore explained.

To drive the longitudinally slidable table 15 at a selected rate of speed, the wide faced gear 329 journalled on the cross traversing shaft 330 is disposed to engage a spur gear 351 keyed to a table driving shaft 352 rotatably journalled toward the front central portion of the knee 13 in bearings 353 and 354, as shown in Figs. 13 and 14. The table driving shaft 352 is splined at its inner end in manner to slidably engage a complementary internally splined hub of a bevel gear 355 which is rotatably journalled in the depending saddle bracket 344. From the horizontally journalled bevel gear 355, as shown in Figs. 11 and 13, power is transmitted to drive a cooperating bevel gear 356 integrally formed with a vertical stub shaft 357 which has keyed to its upper end another bevel gear 358 to constitute a unitary drive assembly vertically journalled for rotation in the saddle 14 by means of bearings 359 and 360. To effect reversal in the direction of table movement, another pair of bevel gears 365 and 366 rotatably journalled on a horizontally positioned table driving sleeve 367 are disposed to meshingly engage the upper vertically journalled bevel gear 358 in manner to be simultaneously driven thereby in opposite directions of rotation.

For effecting selective longitudinal movement of the table 15 relative to the saddle 14, there is provided a stationary nonrotatable nut 368 secured to a vertically upstanding bracket 369 of the saddle in a manner to cooperate with a rotatable table screw 370 journalled at its opposite ends in a pair of end brackets 371 and 372 depending from the opposite ends of the table 15, as shown in Figs. 1 and 11. To rotate the table screw 370, the table screw sleeve 367 is keyed thereto and is arranged to be connected to be driven by either one of the reversedly rotating bevel gears 365 and 366 journalled on the sleeve. To this end, there is provided between the oppositely rotating bevel gears, a clutch collar 373 having slidable splined engagement with the sleeve 367 and provided at its ends with clutch teeth disposed to be selectively engaged with complementary clutch teeth formed on the adjacent faces of the bevel gears 365 and 366.

For effecting independent power driven movements of the knee 13, the saddle 14 and the table 15, the clutch reversing mechanisms respectively associated therewith are disposed to be selectively actuated by separate control levers at the front of the machine. To effect a selective vertical adjustment of the knee 13 along the front face of the column 12, the control lever 26 at the front of the knee is operatively connected to actuate a shifting fork 374 engaging an annular groove in the clutch sleeve 345, as shown in Fig. 14, and is operable to shift the clutch sleeve into clutch engagement with one or another of the reversedly rotating spur gears 334 and 338. To effect a power driven movement of the saddle 14 toward or from the face of the column 12, the shiftable control lever 27, Fig. 1, at the front of the knee is connected to actuate a shifting fork 375, Figs. 13 and 14, engaging an annular groove formed in the clutch sleeve 339 for effecting shiftable movement of the sleeve into clutching engagement with either of the oppositely rotating spur gears 329 and 337, respectively. For effecting a selective longitudinal power driven movement of the table 15, there is provided at the front of the saddle 14, the shifting lever 28, Fig. 1, which is operatively connected through a linkage mechanism (not shown) to adjust a shifting fork 379, Fig. 11, engaging an annular groove in the clutch collar 373 for selectively shifting the collar into clutching engagement with either of the reversedly rotating bevel gears 365 and 366, respectively.

With the directional shifting levers 26, 27 and 28, shown in Fig. 1, for the knee 13, the saddle 14 and the table 15 moved to shiftably actuate the reversing mechanisms respectively associated therewith; the knee, saddle and table may be power driven at a selected work feeding rate or at a faster rapid traverse rate of speed. To drive the respectively slidable members at a fast or rapid traverse rate of speed, there is provided the clutching mechanism 317, Fig. 14, operatively connected to be actuated by the rapid traverse lever 31, Fig. 1, pivotally mounted at the rightward side of the knee 13 through a linkage mechanism (not shown). As schematically shown in Fig. 14, engagement of the clutching mechanism 317 will effect a transmission of power from the constant speed rapid traverse drive shaft 316 to rotate the shaft 335 and the gear 338 keyed thereto at a fast or rapid traverse rate of speed. With the gear 338 of the knee reversing mechanism 336 rotating at a fast rate of speed, the spur gears 329 and 337 for the saddle reversing mechanism, the bevel gears 365 and 366 for the table reversing mechanism and the other oppositely rotatable gear 334 of the knee reversing mechanism 336 will be caused to rotate at a faster rate of speed because of the operative driving interconnection therebetween as hereinbefore explained. The gears 326 and 328 secured to the shaft 327, as well as the feed driving gear 322 will likewise be rotated at a fast rate of speed, the rollover clutch mechanism 323 functioning to permit the gear 322 to overrun the feed driving shaft 321, regardless of whether or not the shaft 321 is being driven at a selected feeding rate.

For effecting manual adjustment of the knee 13, the saddle 14 and the table 15 independently of the selectively connectable power driven means, there are provided individually and separately operable manual control means. For effecting longitudinal movement of the table 15, a handwheel 380 at the leftward end thereof is selectively connectable to effect rotation of the table screw 370 relative to the table screw nut 368, as shown in Figs. 1 and 11. For effecting cross traversing movement of the saddle 14, a handwheel 381 at the front of the knee 13 is selectively connectable to effect manual rotation of the cross traversing shaft 330 relative to its cooperating nut 343, as shown in Fig. 13. To effect vertical adjustment of the knee 13 relative to the column 12, a crank 382 at the front of the knee is journalled on a shaft extension 383, Fig. 13, in a manner to be selectively connectable to effect manual rotation of an elevating shaft 384 journalled in the knee. A spur gear 385 keyed to the forward end of the shaft 384 is disposed to meshingly engage a cooperating spur gear 386 keyed to a second shaft 387 journalled in the leftward side of the knee 13 and which carries at its inner end a bevel gear 388 disposed to transmit power for effecting manually driven rotation of the bevel gear 302 keyed to the elevating screw nut 265. Manual rotation of the elevating screw nut 265 operates through the interconnecting spur gears 295, 297 and 296 to effect a synchronized rotation of the other elevating screw nut 266 for effecting a manual vertical adjustment of the knee 13. As more fully explained in the aforementioned Patent No. 2,182,421, interlocking means are provided to prevent an operative engagement of any one of the manually manipulatable controls 380, 381 and 382 whenever the directional levers 28, 27 and 26 are shiftably engaged to effect power driven movement of the table 15, saddle 14 and knee 13, respectively. The interlocking means likewise are operative to prevent shiftable engagement of the directional shifting levers for effecting power driven adjustment, whenever the manually operable controls are connected to effect manual adjustment of the table, saddle and knee.

It will be noted that, with the exception of the elevating screws and their cooperating nuts which are enclosed in the telescoping protective housings 263 and 264, Fig. 11, all of the other rotatable shafts and interconnected gearing are completely enclosed within the machine to afford complete protection to the machine operator. As shown in Figs. 11 and 13, there is provided in the upper central portion of the knee 13, an enlarged rectangularly shaped recess or well 391 extending longitudinally of the knee in manner to receive the depending bracket 344 of the saddle 14 to permit transverse adjustment of the saddle relative to the knee. By means of this arrangement, the rotatable cross traversing shaft 330 and the table driving shaft 352 are completely enclosed within the rectangular recess 391, regardless of the transversely adjusted position of the saddle 14 along the upper surface of the knee.

To facilitate assembly or disassembly of the machine and, at the same time, to provide means for retaining the saddle in guidable sliding relationship on the upper surface 292 of the knee, there is provided at the upper central portion of the knee immediately above the rectangular well 391 formed therein, a dovetailed guideway 392, Fig. 1, having inwardly inclined guiding surfaces 393 and 394, Fig. 11, extending longitudinally along the upper surface of the knee. A cooperating dovetailed guide 395, Fig. 1, depending from and integrally formed with the underside of the saddle 14, is provided with a pair of outwardly inclined guiding faces 396 and 397. As shown in Fig. 11, a pair of gibs 398 and 399 machined and scraped to proper predetermined sizes are respectively inserted at either side of the saddle dovetail 395 and are secured in adjusted position by means of adjusting screws 402 and 403 threadedly engaging the saddle 14. The rightward gib 399 is provided with parallelly spaced sides while the leftward gib 398 is provided with an inner side having a longitudinal taper disposed to cooperate with a similar longitudinal taper formed in the inclined side 396 of the saddle dovetailed guide 395, as indicated by the dotted line 401. Thus, inward adjustment of the leftward gib 398 relative to the saddle 14 operates to tighten the slidable engagement of the saddle within the dovetailed guideway 392 of the knee 13. With the gibs 398 and 399 retained in their properly adjusted positions relative to the saddle, the outward sides of the ribs will be in slidable guiding relationship with the inwardly inclined sides 393 and 394 respectively, of the dovetailed guideway formed in the knee. In order to disassemble the saddle from the knee, it is necessary to remove the adjusting screws 402 and 403 and withdraw the gibs 398 and 399 from their positions at either side of the dovetailed guide of the saddle and disengage any other parts interconnecting the saddle to the knee. With the gibs 398 and 399 withdrawn from their positions, the saddle 14, as well as the table 15 slidably carried thereby, may be moved vertically a sufficient distance to completely withdraw the depending bracket 344 of the saddle from the rectangularly shaped recess 391 of the knee 13.

The saddle 14 is guidably retained for transverse slidable movement along the upper surface 292 of the knee 13 for movement in a horizontal plane perpendicular to the plane in which the knee is vertically adjustable by means of the gibs 398 and 399 inserted between the respectively associated sides of the dovetailed guideway 392 of the knee and the dovetailed guide 395 of the saddle. Cooperating with the gibs 398 and 399 for maintaining the underside of the saddle 14 in slidable engagement with the top surface of the knee 13 are a second pair of gibs 405 and 406, respectively secured to the undersides of a pair of downwardly extending flanges 407 and 408 formed at the opposite sides of the saddle 14. The upper inner surface of each of the rectangular gibs 405 and 406 is disposed to slidably engage a way surface formed on the underside of each one of two rectangularly shaped ways 409 and 410 extending outwardly from the opposite upper sides of the knee 13, respectively.

In a similar manner, for retaining the rearward surface of the knee 13 in slidable engagement with a pair of vertical way surfaces 411 and 412 formed on the front face 293 of the column, as shown in Fig. 13, there are provided a pair of rectangular gibs 413 and 414, respectively secured to a pair of vertical flanged guide members 415 and 416 integrally formed with the rearward vertical wall of the knee 13. To guidably retain the knee 13 for slidable movement in a vertical plane perpendicular to the front face 293 of the column 12, there is provided a longitudinally tapered gib 417 arranged to be adjustably secured between one side of the leftward column way surface 411 and a side 418 of a rectangularly shaped vertical section rearwardly extending from and integrally formed with the rearward wall of the knee.

In a modified form of the variable speed transmission mechanism for driving the tool spindle 16, shown in Fig. 3, the range change mechanism C is so arranged as to provide for mounting a flywheel 421 on the spindle 16 immediately within the forward wall of the column 12. A principal advantage afforded by this construction arises from the fact that placing the flywheel 421 as close as possible to the tool retaining end of the spindle 16 reduces to a minimum the deflection caused by torsional stress in the spindle 16 in rotating a tool to perform a cutting operation on a workpiece. To rotate the cutter spindle 16 at a selected speed in a low, intermediate or in a high speed range, the intermediate range changing mechanism B and the range changing mechanism C are coordinately operable on adjustment of the speed selecting lever 21 and the range change lever 20 to transmit power from the coordinately adjustable speed changing device A for rotatably driving the tool spindle 16 at a selected one of twenty-four driving speeds, as hereinbefore explained. The speed selecting lever 21, Fig. 1, is operative to shiftably adjust the speed changing device A, Fig. 3, coordinately with the intermediate range changing mechanism B for transmitting driving power from the input bevel gear 36 to rotate the driving shaft 62, immediately below and parallel to the spindle 16, at a selected one of sixteen driving speeds. The range change lever 20, Fig. 1, is operatively connected to shiftably adjust the range change mechanism C for transmitting driving power from the driving shaft 62 to drive the spindle in a low or a high range selectively. During the first sixteen revolutions of the speed selecting crank 21, Fig. 1, the range change lever 20 is retained in its low range driving position, and for the last eight revolutions of the crank 21, the range change lever 20 is moved to its high range position for driving the tool spindle 16 through its complete range of twenty-four driving speeds.

As shown in Fig. 3, the modified form of the range changing mechanism C comprises a high speed driving pinion 422 rotatably journalled on the drive shaft 62 and disposed to be in constant meshing engagement with a gear 423 splined on the spindle 16 in combination with a low speed driving pinion 424 slidably splined on the drive shaft 62. For driving the tool spindle 16 in the low range, the low range driving pinion 424 is shiftably adjusted to its extreme rightward position on the shaft 62, as shown in Fig. 3, in a manner to meshingly engage a low range gear 425 integrally formed with the flywheel 421 which is splined directly to the spindle 16. For driving the tool spindle 16 in the high range, the low range pinion 424 is shifted leftwardly in a manner that the leftward end thereof engages an internal gear 426 formed in the high range pinion 422, thereby locking the pinion to the driving shaft 62. Since the high range pinion 422 is of the helical type disposed to be in constant meshing engagement with the complementary helical gear 423 splined to the spindle 16, engagement of the low range pinion 424 with the internal gear 426 formed in the helical pinion 422 will effect transmission of power from the driving shaft 62 to rotate the tool spindle through its high range of operating speeds. To adjust the range changing mechanism C for driving the tool spindle 16 in the high range or in the low range of speed selectively, there is provided on the low range pinion 424 an annular groove disposed to be engaged by a shifter fork 427 operatively connected to be shiftably adjusted by means of the range change lever 20.

In a modified form of an elevating mechanism for effecting vertical adjustment of the knee 13 along the front face of the column 12, there are provided a pair of elevating screw nuts nonrotatably secured to the column base 262 in parallel longitudinally spaced relationship and extending upwardly to threadedly engage a pair of rotatable elevating screws journalled in the knee 13 toward the opposite outer sides thereof. Selective vertical movement of the knee 13 is accomplished by simultaneously rotating the elevating screws by means of interconnected gearing similar to the operatively interconnected mechanism shown in Fig. 11 for effecting a simultaneous rotation of the elevating screw nuts 265 and 266 there shown, as hereinbefore described. A detailed view showing a part of the modified form of the elevating mechanism for vertically adjusting the knee 13 is illustrated in Fig. 10, in which an elongated elevating screw nut 430 is shown disposed to be received at its lower end 431 within a bored hole formed in the forwardly extending base 262 of the column 12 and is secured thereto by means of dowels 432 and screws 433 extending through a flnaged portion of the nut to engage the base 262. The nut 430 extends upwardly to engage with its upper internally threaded end 434, a helically threaded screw 435 provided with an extreme upper end portion 436 of reduced diameter keyed within a socket formed in a rotatable driving sleeve or bell 437. The driving sleeve 437 is rotatably journalled within the knee 13 in bearings 438 and 439 and is selectively driven by means of a bevel gear 440 keyed thereto. The bevel gear 440 is disposed to meshingly engage the bevel gear 350, Fig. 13, for transmitting power from the elevating shaft 348 to rotate the elevating screw at a selected rate of speed. Also secured to the driving sleeve 437 for the elevating screw 435, Fig. 10, is a spur gear 441 which is arranged to operatively engage the centrally located spur gear 297, Figs. 11 and 13, for transmitting power to rotate the third spur gear 295 which may be keyed to a cooperatively disposed rotatable elevating screw driving sleeve (not shown), instead of to the rotatable nut 265 hereinbefore described.

From the foregoing explanation of the construction and operation of the preferred embodiment of the invention, it is apparent that there has been provided an improved transmission and control mechanism for a milling machine of the knee and column type that is capable of effecting speed changes throughout an extremely wide range of operation with facility and accuracy. A high powered spindle driving motor that is coordinately operable with a separate work feeding motor is disposed to drive the tool spindle with relatively high torque at high speeds in manner to effect rapid removal of metal from a workpiece. To provide greater rigidity for the work supporting table and to increase the accuracy with which a machining operation may be performed, by minimizing the deflection caused by increased cutting pressures, there is provided an improved elevating mechanism comprising two elevating screws in combination with complementary elevating screw nuts which are arranged in parallelly spaced relationship for adjustably supporting the vertically movable knee. The improved elevating mechanism is operatively connected to be selectively actuated by the work feeding motor for effecting an equalized vertical adjustment of the work supporting members, including the knee, as well as the saddle and the table slidably superimposed thereupon.

While the invention has been shown and described as applied to the driving train for operating the tool spindle of a milling machine and the cooperating work supporting structure thereof, it is to be understood that it may be incorporated with equal advantage in the work supporting and power transmission mechanism of any other movable member of a machine tool.

Although particular structures have been shown and described in considerable detail as exemplary of the manner in which the invention may be practiced, it will be apparent to those skilled in the art to which this invention relates that various modifications of the structures herein shown my be effected without departing from the spirit and scope of the invention as defined in the subjoined claims.

The principles of the invention having now been fully explained in connection with the foregoing description of embodying structure, we hereby claim as our invention:

1. In combination with a column provided with a forwardly extending base, a vertically adjustable knee slidably carried by said column for selective vertical movement above said base and presenting spaced bearing surfaces, a work support slidably carried on said knee, a drive bracket secured to said work support for movement therewith and arranged to extend downwardly between the said bearing surfaces of said knee, driving means including a shaft disposed to connect said knee and said work support in manner to effect selective movement thereof, a pair of telescoping members spaced in parallelism toward the opposite outer sides of said knee interconnected between said base and said knee, said telescoping members having their upper ends respectively disposed immediately beneath said said bearing surfaces of said knee, said telescoping members being spaced apart a distance approximately five-eighths to three-fourths the width of said knee, a pair of bearings carried within the lower portion of said knee adapted to support the central portions of said telescoping members in manner to resist lateral deflection thereof, said bearings being so positioned in said knee as to be midway between the upper and lower ends of said telescoping members when said knee is in its lowermost position, an idler journalled in said knee intermediately of said telescoping members, a pair gears of relatively large diameter secured to each of the said movable elements of said members and disposed to engage said idler for effecting a substantially equalized vertical adjustment of said knee.

2. In a machine tool, a column having a forwardly projecting base, a work support slidably carried by said column for vertical adjustment above said base and provided in its central portion with a sump for lubricating oil, a pair of parallelly spaced telescoping members comprising separate pairs of cooperating screw and nut mechanisms operatively interconnected between said knee and said base in manner to effect a selective vertical adjustment of said knee, a pair of telescoping housings respectively disposed to enclose said telescoping members and arranged to form a leakproof enclosure therefor said housings respectively having in their upper peripheral walls a discharge port communicating with the said oil sump in the said work support, and means for lubricating said screw and nut mechanisms including a tube connected to transmit lubricating oil from the said sump to the upper ends of said telescoping members above the points of engagement between the respective screw and nut mechanisms thereof whereby the said telescoping housings will function as a reservoir to collect the oil after said screw and nut mechanisms have been lubricated and whereby the said discharge port formed therein will function to return the said oil collected within said telescoping housings to the said sump in said work support.

3. In a milling machine, a column having a forwardly extending base, a knee slidably supported by said column for vertical adjustment above said base and having in its central portion a reservoir for lubricating oil, a pair of nonrotatable elevating screws secured to said base in parallel spaced relationship beneath said knee, a pair of cooperating elevating screw nuts journalled in said knee and disposed to cooperate with said elevating screws each of said nuts being formed in the shape of an elongated hollow sleeve having its upper and central portions rotatably supported in bearings positioned in the upper and central portions of said knee and having its lower end projecting below the lowermost portion of said knee, said nuts being provided with internally formed screw engaging threads, a telescoping housing connected at its upper end to said knee and at its lower end to said base disposed to enclose said elevating screws in manner to form a contractible leakproof reservoir for retaining lubricating oil, and means connecting with said oil reservoir disposed to introduce lubricating oil within the hollow central portion of said elongated nut above the upper end of said elevating screw, the said nut being provided in its upper peripheral wall with a discharge port communicating with said oil reservoir in manner to return thereto excess lubricating oil introduced within the hollow central portion of said nut and said telescoping housing being provided in its upper peripheral wall with a discharge port communicating with said reservoir and disposed to return thereto the lubricating oil collecting within the leakproof enclosure formed by said telescoping housing.

4. In an elevating mechanism for the vertically movable knee of a milling machine having a supporting column and a forwardly projecting base, a pair of spaced apart selectively extensible elevating mechanisms operatively interconnected between said knee and said base, said elevating mechanisms respectively comprising cooperating screws and tubular nuts of substantially identical length and being carried for relative rotation, a spur idler gear journalled in said knee intermediately said elevating mechanisms, and a pair of gears respectively encircling said elevating mechanisms in position to operatively engage said idler gear and being connected to effect extensible movement of said elevating mechanisms, said gears being spaced downwardly from the upper ends of said elevating mechanisms a distance approximately one-third the length thereof whenever said knee is in its closest position of adjustment to said base, and said gears having a pitch circumference so proportioned with respect to the lead of said screws that any slight lash which may develop between said idler gear and said gears will introduce such an immeasurably small lineal differential between the relative positions of said nuts along said screws that the synchronism established between said nuts will not be impaired and said nuts will always engage said screws at substantially identical relative positions therealong.

5. In a milling machine, a column presenting a vertical front bearing surface and having a forwardly projecting base, a knee slidably mounted on the front bearing surface of said column for vertical adjustment above said base and having formed in its upper surface a downwardly extending recess perpendicular to the front bearing surface of said column, a pair of telescoping members spaced in parallelism within said knee on opposite sides of the said recess formed therein in a plane parallel to the front bearing surface of said column, said members comprising a movable element and a stationary element and being spaced apart a distance approximately five-eighths to three-fourths the width of said knee in manner to resist lateral deflection thereof and said members having their lower ends secured to said base, a saddle slidably carried by said knee for transverse movement toward and away from said column, a driving bracket secured to the underside of said saddle and extending downwardly into the said recess within said knee, driving means within said recess interconnecting said knee and said bracket in manner to effect selective movement of said saddle, a work table slidably carried by said knee for rectilinear movement in a plane parallel to the front bearing surface of said column, a portion of said table being disposed to overlie said telescoping members irrespective of the transversely adjusted position of said saddle along said knee, an idler gear journalled in said knee beneath the said recess and intermediately of said telescoping members, and a pair of gears respectively secured to the said movable elements of said telescoping members in manner to meshingly engage the said idler gear to actuate said telescoping members in synchronism for effecting a substantially equalized vertical adjustment of said knee.

6. In a milling machine, a vertically upstanding column having a forwardly extending base, a knee slidably carried by said column for selective vertical adjustment above said base, a pair of telescoping devices retractable within said knee and being operatively connected between said knee and said base for effecting vertical movement of said knee, said telescoping devices comprising a pair of threaded stationary members and a cooperating pair of complementary threaded rotatably movable members of approximately equal length, said stationary members being secured at their lower ends to said base in position to extend upwardly into said knee with their upper ends slightly below the top surface thereof whenever said knee is in its lowermost position, said movable members being rotatably secured to said knee slightly below the top surface thereof in a manner to operatively engage the said stationary members associated therewith, bearing means fixedly carried within the lower portion of said knee respectively adapted to support the said movable members, said bearing means being positioned midway between the upper and lower ends of said devices to provide maximum resistance against lateral deflection whenever said knee is in its lowermost position, said bearing means being adapted to provide lateral support for said movable members irrespective of the longitudinally extended position of said telescoping devices, a pair of large diameter drive gears respectively secured to each of said rotatable members, a transfer gear journalled in said knee in a position to engage said drive gears for effecting a synchronous rotation of said movable members, said gears having a pitch circumference so related to the lead of said members that any slight lash between said gears will not interfere with the synchronism in the extensible movement of said telescoping devices, and means in said knee connected to rotate one of said gears for synchronously actuating said devices to effect an equalized vertical adjustment of said knee.

7. In a milling machine having a hollow work supporting knee slidably carried for selective vertical adjustment above a base, an elevating mechanism operatively connected to effect vertical movement of said knee relative to said base and comprising a pair of stationary elevating screws secured to said base in spaced apart parallelism extending vertically upward into said knee, a pair of cooperating elongated tubular nuts rotatably journalled in said knee in spaced relationship to operatively engage said stationary elevating screws, a plurality of bearings carried in spaced relationship immediately beneath the top surface of said knee disposed to rotatably support the upper ends of said tubular nuts, a pair of concentric bearings fixedly carried within the lower half of said knee disposed to rotatably support said tubular nuts in positions spaced downwardly from the said upper bearings, said lower bearings being so positioned in said knee as to be midway between said base and the top surface of said knee whenever said knee is in its lowermost position to provide lateral support to said tubular nuts, a pair of drive gears respectively keyed to said tubular nuts, a third gear journalled in said knee adapted to operatively engage the said drive gears, and means connected to drive one of said gears for synchronously rotating said tubular nuts to effect an equalized vertical adjustment of said knee.

8. In a milling machine, a work supporting knee carried for selective vertical adjustment above a base, and an elevating mechanism interconnected between said base and said knee comprising a pair of stationary elevating screws fixedly secured to said base in spaced apart parallelism, said screws being disposed to extend upwardly into said knee with their extreme upper ends being positioned immediately below the top surface thereof whenever said knee is moved to its lowermost position, a pair of elongated tubular nuts journalled in said knee in spaced apart parallelism disposed to operatively engage said screws, said tubular nuts being substantially as long as the threaded portion of said screws and having their upper ends positioned slightly below the upper surface of said knee and their lower ends projecting slightly below the underside thereof, said nuts being provided at their extreme lower ends with female screw threads adapted to engage said screws and formed immediately below elongated bores extending to the upper ends thereof, a plurality of bearings carried in spaced relationship within said knee adapted to rotatably support the upper ends of said tubular nuts, a pair of bearings carried in said knee concentrically to said upper bearings adapted to rotatably support said nuts at positions spaced below said upper bearings a distance exceeding one half the length of the threaded portions of each of said screws, said lower bearings being so positioned as to provide direct lateral support to the said tubular nuts for resisting lateral deflection regardless of the vertically adjusted position of said tubular nuts along said screws, a pair of gears respectively keyed to said tubular nuts, a third gear journalled in said knee in position to engage the said gears keyed to said nuts, and means connected to selectively rotate one of said gears for synchronously rotating said tubular nuts to effect an equalized vertical adjustment of said knee.

9. In a machine tool, a column having a forwardly extending base, a knee slidably carried by said column for vertical movement above said base and a screw and nut elevating mechanism connected to elevate said knee in a manner to resist lateral deflection and comprising a stationary elevating screw secured at its lower end to said base and extending upwardly into said knee, said screw extending to a point immediately below the top surface of said knee whenever said knee is in its lowermost position, a cooperating elongated tubular nut journalled in said knee presenting at its lower end female threads disposed to operatively engage said screw, said tubular nut being substantially as long as the threaded portion of said screw and extending from a point immediately below the upper surface of said knee to a point slightly below the lowermost point thereof, a plurality of bearings carried in spaced apart relationship within said knee disposed to rotatably support said nut at its extreme upper end and at a point midway between its upper and lower ends, said bearings being so spaced as to restrain said nut against lateral deflection irrespective of the vertically adjusted position of engagement of said nut relative to said screw, and means connected to rotate said nut relative to said screw for effecting a selective vertical adjustment of said knee along said column.

10. In a milling machine having a column and a forwardly extending base, a hollow knee slidably carried by said column for vertical movement above said base, a saddle slidably carried by said knee for movement toward and away from said column, a work table slidably carried by said saddle for longitudinal movement in a plane perpendicular to the plane in which said saddle is movable, a pair of stationary elevating screws secured at their lower ends to said base adapted to extend upwardly into said knee and being spaced apart in the plane in which said table is movable, a pair of elongated tubular nuts journalled in said knee is spaced apart parallelism in a manner to operatively engage said screws, an oil sump in said knee, a lubricating system in said knee connected to transmit oil from said sump to the open upper ends of said tubular nuts in a manner that lubricant can flow downwardly to the points of engagement between said tubular nuts and said screws, and a pair of housings respectively encircling each cooperating pair of said screws and nuts in a manner to collect excess lubricant passing therebetween, said housings being provided at their upper ends with discharge openings formed above said sump to return the excess lubricant thereto in a manner to complete a recirculating lubricating system for lubricating said screws and said nuts.

11. In a milling machine, a column having a forwardly extending base, a hollow knee slidably carried for selective vertical adjustment above said base, a telescoping elevating mechanism retractable into said knee and connected to said base for moving said knee vertically along said column, said elevating mechanism comprising a stationary member and a movable tubular member of substantially equal length, said stationary member being fixedly secured at its extreme lower end to said base and extending vertically upward into said hollow knee, said stationary member being of sufficient length to extend slightly below the top surface of said knee whenever said knee is moved to its lowermost position relative to said base, said tubular member being rotatably secured at its extreme upper end to said knee slightly below the top surface thereof and in a position to extend vertically downward into operative engagement with said stationary member, bearing means secured within the lower half of said knee adapted to support the central mid portion of said tubular member, said bearing means being positioned midway between the top and lower ends of said elevating mechanism whenever said knee is in its lowermost position relative to said base to support said tubular member against lateral deflection, and means connected to selectively actuate said tubular member for effecting selective vertical adjustment of said knee.

12. In a milling machine, a column having a vertical front guiding face and a forwardly extending base, a knee slidably carried on the front face of said column for selective vertical adjustment above said base, an elevating mechanism connected to effect selective vertical adjustment of said knee and comprising a pair of elongated tubular nuts rotatably journalled in spaced apart parallelism toward the opposite outer sides of said knee, said nuts extending from the extreme upper portion of said knee to project slightly below the underside thereof, said nuts presenting toward their extreme lower end female screw threads formed concentrically with enlarged bores extending to the upper ends thereof, a pair of vertically extending elevating screws secured at their lower ends to said base and extending upwardly to operatively engage said tubular nuts, said screws being disposed to extend through said nuts to points immediately below the upper surface of said knee whenever said knee is adjusted to its lowermost position, a pair of large diameter drive gears respectively secured to said tubular nuts, a third large diameter drive gear journalled in said knee to operatively engage the said gears secured to said nuts, said gears having a pitch diameter approximately five times greater than the pitch diameter of said screws to the end that said nuts will be rotatable along said screws in exact synchronism irrespective of any slight lash between said gears, and driving means reversibly connectable to rotate one of said gears for effecting a synchronized rotation of said tubular nuts to move said knee along said column.

13. In a milling machine, a column presenting front vertical way surfaces and a forwardly extending base, a hollow knee slidably secured to the way surface of said column for selective vertical adjustment, said knee being provided with top and lower surfaces perpendicular to the way surfaces of said column, a transverse horizontal web formed within the lower half of said hollow knee in parallelism with the upper surface thereof, said web being provided with spaced apart apertures formed in a plane parallel to the front face of said column, a saddle slidably carried on the top surface of said knee for movement toward and away from said column, a work table slidably carried by said saddle for longitudinal movement in a plane parallel to the front face of said column, a pair of stationary elevating screws secured at their lower ends to said base and extending upwardly into said knee through the apertures in said web, said screws extending to a point immediately below the upper surface of said knee whenever said knee is in its lowermost position, a pair of elongated tubular nuts rotatably journalled in spaced apart parallelism in said knee in a position to operatively engage the said stationary screws, said tubular nuts extending from the extreme upper portion of said knee through the apertures formed in said web, a plurality of bearings carried within said knee adapted to rotatably support said tubular nuts, said bearings being carried in the apertures in said web and in upwardly spaced relationship along said nuts beneath the upper surface of said knee, said bearings being spaced apart along the nuts respectively associated therewith a distance exceeding one half the threaded portion of one of said screws to restrain said nuts against lateral deflection, a pair of drive gears respectively keyed to said tubular nuts, a transfer gear journalled in said knee adapted to meshingly engage said drive gears, and means connected to rotate one of said drive gears for effecting a synchronized rotation of said tubular nuts to move said knee along said column.

14. In a milling machine, a column having a forwardly extending base, a knee slidably mounted on said column for selective vertical movement, a saddle slidably carried on said knee for movement toward and away from said column, a work table slidably carried by said saddle for longitudinal movement in a plane transverse to the plane in which said saddle is movable, a pair of stationary threaded elevating screws fixedly secured to said base at their lower ends being disposed to extend upwardly into said knee to a point immediately below the upper surface thereof whenever said knee is in its lowermost position, said screws being spaced apart in the plane in which said table is longitudinally slidable, a pair of cooperating elongated tubular nuts journalled in spaced apart relationship in said knee in a position to operatively engage said screws, said tubular nuts being substantially as long as the threaded portion of said screws and disposed to have their upper ends positioned immediately below the upper surface of said knee, said elongated tubular nuts being provided at their lower ends with female screw threads disposed to operatively engage the threads on said screws, a plurality of bearings secured in spaced relationship within said knee adapted to rotatably support each of said tubular nuts at positions spaced apart a distance exceeding one half the length of the threaded portion of one of said screws, said bearings being spaced apart along each of said screws to resist lateral deflection whenever said table is moved to one of its extreme longitudinally adjusted positions along said saddle and driving means operatively connected to synchronously rotate said nuts for effecting an equalized vertical movement of said knee along said column.

15. In a milling machine provided with a vertically upstanding column having a forwardly extending base, a hollow knee slidably carried by said column for selective vertical adjustment above said base, said knee being provided with top and bottom sides perpendicular to said column and being joined by vertically extending sides to form a hollow enclosure, a transverse web formed within the lower half of said knee connected to the vertical sides thereof, a threaded stationary elevating screw secured at its extreme lower end to said base extending upwardly into said hollow knee through suitable apertures concentrically formed in the bottom side thereof and in said web, said screw being adapted to extend to a point immediately below the top side of said knee whenever said knee is adjusted to its lowermost position, an elongated tubular nut rotatably journalled in said knee concentrically with said screw, said tubular nut being provided at its extreme lower end with screw engaging threads formed immediately below an enlarged elongated bore extending to the upper end thereof, a bearing carried in said knee immediately below the top surface thereof adapted to rotatably support the upper end of said tubular nut, a second bearing carried in said web adapted to rotatably support the central portion of said tubular nut and being spaced downwardly from said upper bearing a distance exceeding one half the length of the threaded portion of said screw, said second bearing being so spaced relative to said upper bearing as to provide lateral support for said tubular nut, and means connected to selectively rotate said tubular nut to move said knee relative to said base.

16. In a machine tool having a stationary member and a movable member carried for selective vertical adjustment thereabove, a pair of screw and nut mechanisms spaced in parallelism operatively connected between said members, means in said movable member connected to actuate said screw and nut mechanisms for effecting relative movement between said members, a sump for lubricant in said movable member, a lubricating system connected to transmit lubricant from said sump to each of said screw and nut mechanisms respectively at points above the threaded engagement therebetween, and a pair of housings respectively associated with each of said screw and nut mechanisms adapted to collect excess lubricant passing therebetween, said housings being provided at their upper ends with discharge openings arranged to return the excess lubricant to the sump in said movable member.

17. In a machine tool, a supporting column having a forwardly extending base, a knee slidably carried by said column for selective vertical adjustment above said base, said knee presenting on its upper surface a pair of horizontally extending bearing way surfaces and a downwardly extending recess therebetween, a work support slidably guided on the bearing surfaces presented by said knee for movement toward or away from said column, a drive bracket secured to the underside of said work support disposed to extend downwardly into the recess formed in said knee, selectively operable driving means within the recess formed in said knee disposed to operatively connect said drive bracket and said knee for effecting movement of said work support, a pair of selectively extensible telescoping members spaced apart at the opposite sides of the recess formed in said knee arranged to operatively interconnect said knee and said base for effecting selective vertical movement therebetween, a pair of large diameter drive gears respectively encircling said telescoping members and being operatively connected to effect a selective actuation of each of said members respectively, said drive gears being spaced downwardly from the upper ends of said telescoping members approximately one-third the length of each of them, a transfer gear journalled in said knee beneath the recess formed therein connected to operatively engage said drive gears, and a power operable feed transmission carried in said knee connected to actuate one or another of said gears for effecting an equalized vertical movement of said telescoping members to adjust the position of said knee relative to said base.

18. In a machine tool, a pair of members carried for relative movement, a pair of elongated tubular nuts journalled in one of said members, a pair of stationary screws secured at one of their ends to the other of said members in a manner to be operatively engaged by said tubular nuts, said screws being substantially as long as said nuts, a pair of large diameter drive gears respectively encircling said nuts and the cooperating said screws associated therewith, said drive gears being respectively positioned along the central one-third portion of the said nut and screw cooperatively associated therewith whenever said members are in their closest position of adjustment relative to each other, said gears being connected to rotate the said tubular nuts, a transfer gear journalled in a position to operatively engage both of said drive gears for effecting a synchronized rotation of said nuts, and power operable means selectively connectable to rotate one of said gears for effecting an equalized relative movement between said members.

References Cited in the file of this patent

UNITED STATES PATENTS

| Number | Name | Date |
|---|---|---|
| 1,258,975 | Arthur | Mar. 12, 1918 |
| 1,340,741 | Schmelzer | May 18, 1920 |
| 1,371,772 | Blood | Mar. 15, 1921 |
| 1,430,268 | Sundstrand | Sept. 26, 1922 |
| 1,749,073 | Graves | Mar. 4, 1930 |
| 1,847,446 | Robinson et al. | Mar. 1, 1932 |
| 1,889,930 | Morton | Dec. 6, 1932 |
| 1,966,021 | Rusnak | July 10, 1934 |
| 1,985,225 | Archea | Dec. 25, 1934 |
| 2,082,140 | Bennett et al. | June 1, 1937 |
| 2,129,049 | Doran | Sept. 6, 1938 |
| 2,145,355 | Jereczek | Jan. 31, 1939 |
| 2,192,856 | Nenninger | Mar. 5, 1940 |
| 2,203,943 | Davis | June 11, 1940 |
| 2,226,431 | Hassman et al. | Dec. 24, 1940 |
| 2,239,567 | Nenninger | Apr. 22, 1941 |
| 2,273,963 | Jereczek | Feb. 24, 1942 |
| 2,308,708 | Nenninger et al. | Jan. 19, 1943 |
| 2,327,109 | Hirsch | Aug. 17, 1943 |
| 2,338,624 | Curtis | Jan. 4, 1944 |
| 2,382,934 | Armitage | Aug. 14, 1945 |
| 2,402,290 | Nenninger et al. | June 18, 1946 |
| 2,452,674 | Nenninger et al. | Nov. 2, 1948 |
| 2,459,976 | Vancil et al. | Jan. 25, 1949 |
| 2,466,198 | Berthiez | Apr. 5, 1949 |
| 2,473,596 | Le Blond et al. | June 21, 1949 |

FOREIGN PATENTS

| 342,664 | Great Britain | Published 1931 |